United States Patent
Lee et al.

(10) Patent No.: US 9,978,040 B2
(45) Date of Patent: May 22, 2018

(54) COLLABORATION SESSIONS IN A WORKSPACE ON A CLOUD-BASED CONTENT MANAGEMENT SYSTEM

(75) Inventors: David T. Lee, Foster City, CA (US); Philip Sheffield, San Francisco, CA (US)

(73) Assignee: Box, Inc., Redwood City, CA (US)

( * ) Notice: Subject to any disclaimer, the term of this patent is extended or adjusted under 35 U.S.C. 154(b) by 16 days.

(21) Appl. No.: 13/208,615

(22) Filed: Aug. 12, 2011

(65) Prior Publication Data

US 2013/0014023 A1    Jan. 10, 2013

Related U.S. Application Data

(60) Provisional application No. 61/506,013, filed on Jul. 8, 2011.

(51) Int. Cl.
*G06F 3/01* (2006.01)
*G06F 17/30* (2006.01)
*G06Q 10/10* (2012.01)

(52) U.S. Cl.
CPC ......... *G06Q 10/103* (2013.01); *G06Q 10/101* (2013.01)

(58) Field of Classification Search
CPC .. H04L 12/581; G06F 17/30091; G06Q 10/10
USPC ................................. 715/751, 721
See application file for complete search history.

(56) References Cited

U.S. PATENT DOCUMENTS

| | | |
|---|---|---|
| 5,787,175 A | 7/1998 | Carter |
| 5,799,320 A | 8/1998 | Klug |
| 5,848,415 A | 12/1998 | Guck |
| 5,864,870 A | 1/1999 | Guck |
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,073,161 A | 6/2000 | DeBoskey et al. |
| 6,098,078 A | 8/2000 | Gehani et al. |
| 6,233,600 B1 | 5/2001 | Salas et al. |
| 6,260,040 B1 | 7/2001 | Kauffman et al. |

(Continued)

FOREIGN PATENT DOCUMENTS

| | | |
|---|---|---|
| CA | 2724521 | 11/2009 |
| CN | 101997924 A | 3/2011 |

(Continued)

OTHER PUBLICATIONS

Yahoo! Groups, http://web.archive.org/web/20090320101529/ http://en.wikipedia.org/wiki/Yahoo!_Groups, Mar. 20, 2009, pp. 1-6.*

(Continued)

*Primary Examiner* — Jennifer To
*Assistant Examiner* — Jasmine Wan
(74) *Attorney, Agent, or Firm* — Perkins Coie LLP

(57) ABSTRACT

Systems and methods for providing discussion workspaces linked to workspaces containing work items stored in a web-based content management system with collaboration environment are disclosed. Workspaces can be organized hierarchically. Designated collaborators of a workspace containing work items can participate in an online discussion in the linked discussion workspace regarding the work items.

25 Claims, 15 Drawing Sheets

(56) References Cited

U.S. PATENT DOCUMENTS

| | | |
|---|---|---|
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,539,381 B1 | 3/2003 | Prasad et al. |
| 6,584,466 B1 * | 6/2003 | Serbinis et al. ............... 715/209 |
| 6,636,872 B1 | 10/2003 | Heath et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,130,831 B2 | 10/2006 | Howard et al. |
| 7,133,834 B1 | 11/2006 | Abelow |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,222,078 B2 | 5/2007 | Abelow |
| 7,275,244 B1 | 9/2007 | Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,370,269 B1 | 5/2008 | Prabhu et al. |
| 7,386,535 B1 | 6/2008 | Kalucha et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,886,287 B1 | 2/2011 | Davda |
| 7,890,964 B2 | 2/2011 | Vogler-Ivashchanka et al. |
| 7,937,663 B2 | 5/2011 | Parker et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,214,747 B1 | 7/2012 | Yankovich et al. |
| 8,230,348 B2 | 7/2012 | Peters et al. |
| 8,358,701 B2 | 1/2013 | Chou et al. |
| 8,370,803 B1 | 2/2013 | Holler et al. |
| 8,429,540 B1 | 4/2013 | Yankovich et al. |
| 8,464,161 B2 | 6/2013 | Giles et al. |
| 8,473,532 B1 * | 6/2013 | Ben .................. G06F 17/30091 |
| | | 707/694 |
| 8,527,549 B2 | 9/2013 | Cidon |
| 8,549,066 B1 | 10/2013 | Donahue et al. |
| 8,549,511 B2 | 10/2013 | Seki et al. |
| 8,607,306 B1 | 12/2013 | Bridge et al. |
| 8,849,955 B2 | 9/2014 | Prahlad et al. |
| 2001/0027492 A1 | 10/2001 | Gupta |
| 2002/0091738 A1 | 7/2002 | Rohrabaugh et al. |
| 2002/0099772 A1 | 7/2002 | Deshpande et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2004/0021686 A1 | 2/2004 | Barberis |
| 2004/0088332 A1 * | 5/2004 | Lee ........................ G06Q 10/10 |
| 2004/0088647 A1 | 5/2004 | Miller et al. |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0230624 A1 | 11/2004 | Frolund et al. |
| 2004/0246532 A1 | 12/2004 | Inada |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022229 A1 | 1/2005 | Gabriel et al. |
| 2005/0028006 A1 | 2/2005 | Leser et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0223068 A1 * | 10/2005 | Shohfi .................... G06Q 10/10 |
| | | 709/206 |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0031346 A1 * | 2/2006 | Zheng ................. G06Q 10/107 |
| | | 709/206 |
| 2006/0036568 A1 | 2/2006 | Moore et al. |
| 2006/0041603 A1 | 2/2006 | Paterson et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0117247 A1 | 6/2006 | Fite et al. |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0242204 A1 | 10/2006 | Karas et al. |
| 2006/0259524 A1 | 11/2006 | Horton |
| 2006/0265719 A1 | 11/2006 | Astl et al. |

(56) References Cited

U.S. PATENT DOCUMENTS

| | | |
|---|---|---|
| 2006/0271510 A1 | 11/2006 | Harward et al. |
| 2007/0016680 A1 | 1/2007 | Burd et al. |
| 2007/0038934 A1 | 2/2007 | Fellman |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0198609 A1 | 8/2007 | Black et al. |
| 2007/0198647 A1* | 8/2007 | Lingafelt ............ H04L 12/1822 709/207 |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0046828 A1 | 2/2008 | Bibliowicz et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0044128 A1 | 2/2009 | Baumgarten et al. |
| 2009/0049131 A1 | 2/2009 | Lyle et al. |
| 2009/0083338 A1* | 3/2009 | Evans .................. H04L 12/581 |
| 2009/0094329 A1* | 4/2009 | Ambati .................. G06Q 10/10 709/204 |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1* | 6/2009 | Ghods et al. .................. 707/100 |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0300356 A1 | 12/2009 | Crandell |
| 2009/0300527 A1 | 12/2009 | Malcolm et al. |
| 2009/0307604 A1* | 12/2009 | Giles .................... G06F 21/604 715/751 |
| 2009/0327358 A1 | 12/2009 | Lukiyanov et al. |
| 2009/0327961 A1 | 12/2009 | De Vorchik et al. |
| 2010/0005402 A1* | 1/2010 | George .................. H04L 51/04 715/758 |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |

(56) References Cited

U.S. PATENT DOCUMENTS

| | | |
|---|---|---|
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0113320 A1 | 5/2011 | Neff et al. |
| 2011/0119313 A1 | 5/2011 | Sung et al. |
| 2011/0137991 A1 | 6/2011 | Russell |
| 2011/0142410 A1 | 6/2011 | Ishii |
| 2011/0145744 A1 | 6/2011 | Haynes et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0173625 A1 | 7/2012 | Berger |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192064 A1* | 7/2012 | Antebi .................. G06Q 10/10 715/255 |
| 2012/0192086 A1 | 7/2012 | Ghods et al. |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0257249 A1 | 10/2012 | Natarajan |
| 2012/0263166 A1 | 10/2012 | Cho et al. |
| 2012/0266203 A1 | 10/2012 | Elhadad et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080919 A1 | 3/2013 | Kiang et al. |
| 2013/0117337 A1 | 5/2013 | Dunham |
| 2013/0117376 A1 | 5/2013 | Filman et al. |
| 2013/0124638 A1 | 5/2013 | Barreto et al. |
| 2013/0125051 A1* | 5/2013 | Kelley ................ G06F 17/3007 715/810 |
| 2013/0138608 A1 | 5/2013 | Smith |
| 2013/0138615 A1 | 5/2013 | Gupta et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212486 A1 | 8/2013 | Joshi et al. |
| 2013/0218978 A1 | 8/2013 | Weinstein et al. |
| 2013/0239049 A1 | 9/2013 | Perrodin et al. |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0305039 A1 | 11/2013 | Gauda |
| 2013/0326344 A1 | 12/2013 | Masselle et al. |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0068589 A1 | 3/2014 | Barak |
| 2014/0150023 A1 | 5/2014 | Gudorf et al. |

(56) References Cited

U.S. PATENT DOCUMENTS

| | | |
|---|---|---|
| 2014/0156373 A1 | 6/2014 | Roberts et al. |
| 2014/0172595 A1 | 6/2014 | Beddow et al. |

FOREIGN PATENT DOCUMENTS

| | | | |
|---|---|---|---|
| CN | 102264063 | A | 11/2011 |
| EP | 0921661 | A2 | 6/1999 |
| EP | 1349088 | | 10/2003 |
| EP | 1528746 | A2 | 5/2005 |
| EP | 2372574 | A1 | 10/2011 |
| EP | 2610776 | A2 | 7/2013 |
| GB | 2453924 | A | 4/2009 |
| GB | 2471282 | A | 12/2010 |
| JP | 09-101937 | | 4/1997 |
| JP | 11-025059 | | 1/1999 |
| JP | 2003273912 | A | 9/2003 |
| JP | 2004310272 | A | 11/2004 |
| JP | 09-269925 | | 10/2007 |
| JP | 2008250944 | A | 10/2008 |
| KR | 20020017444 | A | 3/2002 |
| KR | 20040028036 | A | 4/2004 |
| KR | 20050017674 | | 2/2005 |
| KR | 20060070306 | A | 6/2006 |
| KR | 20060114871 | A | 11/2006 |
| KR | 20070043353 | A | 4/2007 |
| KR | 20070100477 | A | 10/2007 |
| KR | 20100118836 | A | 11/2010 |
| KR | 20110074096 | A | 6/2011 |
| KR | 20110076831 | A | 7/2011 |
| WO | WO-0007104 | A1 | 2/2000 |
| WO | WO-2002019128 | A1 | 3/2002 |
| WO | WO-2004097681 | A1 | 11/2004 |
| WO | WO-2006028850 | A2 | 3/2006 |
| WO | WO-2007024438 | A1 | 3/2007 |
| WO | WO-2007035637 | A2 | 3/2007 |
| WO | WO-2007113573 | A2 | 10/2007 |
| WO | WO-2008011142 | A1 | 1/2008 |
| WO | WO-2008076520 | A2 | 6/2008 |
| WO | WO-2011109416 | A2 | 9/2011 |
| WO | WO-2012167272 | A1 | 12/2012 |
| WO | WO-2013009328 | A2 | 1/2013 |
| WO | WO-2013013217 | A1 | 1/2013 |
| WO | WO-2013041763 | A1 | 3/2013 |
| WO | WO-2013166520 | | 11/2013 |

OTHER PUBLICATIONS

Internet Forums, http://web.archive.org/web/20100528195550/http://en.wikipedia.org/wiki/Internet_forums, May 30, 2010, pp. 1-20.*
Wiki, http://web.archive.org/web/20100213004936/http://en.wikipedia.org/wiki/Wiki, Feb. 13, 2010, pp. 1-16.*
Google Docs, Apr. 13, 2010, http://web.archive.org/web/20100413105758/http://en.wikipedia.org/wiki/Google_docs, pp. 1-7.*
International Search Report and Written Opinion for PCT/US2011/039126 dated Oct. 6, 2011, pp. 1-13.
Partial International Search Report for PCT/US2011/041308 dated Feb. 27, 2012, pp. 1-2.
International Search Report and Written Opinion for PCT/US2011/056472 dated Jun. 22, 2012, pp. 1-12.
Langfeld L. et al., "Microsoft SharePoint 2003 Unleashed," Chapters 11 and 15, Jun. 2004, pp. 403-404, 557-561, 578-581.
International Search Report and Written Opinion for PCT/US2011/041308 dated Jul. 2, 2012, pp. 1-16.
U.S. Appl. No. 13/030,090, filed Feb. 27, 2011, Ghods et al.
U.S. Appl. No. 13/152,982, filed Jun. 3, 2011, Ghods et al.
U.S. Appl. No. 13/165,725, filed Jun. 21, 2011, Trombley-Shapiro et al.
U.S. Appl. No. 13/166,733, filed Jun. 22, 2011, Seibert et al.
International Search Report PCT/US2008/012973 dated Apr. 30, 2009, pp. 1-3.
Supplementary European Search Report European Application No. EP 08 85 8563 dated Jun. 20, 2011 pp. 1-5.
Written Opinion PCT/US2008/012973 dated Apr. 30, 2009, pp. 1-4.
"Understanding Metadata," National Information Standards Organization, NISO Press, 2004, 20 pages.
International Search Report and Written Opinion for PCT/US2012/056955, Applicant: Box, Inc., dated Mar. 27, 2013, pp. 1-11.
International Search Report and Written Opinion for PCT/US2011/047530, Applicant: Box, Inc., dated Mar. 22, 2013, pp. 1-10.
International Search Report and Written Opinion for PCT/US2012/065617, Applicant: Box, Inc., dated Mar. 29, 2013, 9 pages.
International Search Report and Written Opinion for PCT/US2012/067126, Applicant: Box, Inc., dated Mar. 29, 2013, 10 pages.
International Search Report and Written Opinion for PCT/US2012/063041, Applicant: Box, Inc., dated Mar. 29, 2013, 12 pages.
International Search Report and Written Opinion for PCT/US2011/057938, Applicant: Box, Inc., dated Mar. 29, 2013, 10 pages.
International Search Report and Written Opinion for PCT/US2013/034662, Applicant: Box, Inc., dated May 31, 2013, 10 pages.
Exam Report for GB1306011.6, Applicant: Box, Inc. dated Apr. 18, 2013, 8 pages.
Exam Report for GB1300188.8, Applicant: Box, Inc. dated May 31, 2013, 8 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
Exam Report for EP13158415.3, Applicant: Box, Inc. dated Jun. 4, 2013, 8 pages.
International Search Report and Written Opinion for PCT/US2013/029520, Applicant: Box, Inc., dated Jun. 26, 2013, 10 pages.
International Search Report and Written Opinion for PCT/US2013/023889, Applicant: Box, Inc., dated Jun. 24, 2013, 13 pages.
International Search Report and Written Opinion for PCT/US2013/035404, Applicant: Box, Inc., dated Jun. 26, 2013, 13 pages.
Parr, "Google Docs Improves Commenting, Adds E-mail Notifications," Apr. 16, 2011, mashable.com, pp. 1-6.
"Microsoft Office SharePoint 2007 User Guide," Feb. 16, 2010, pp. 1-48.
Lars, "35 Very Useful Online Tools for Improving your project Management and Team Collaboration," Apr. 31, 2010, tripwiremagazine.com, pp. 1-32.
International Search Report and Written Opinion for PCT/US2010/070366, Applicant: Box, Inc., dated Mar. 24, 2013, 10 pages.
"How-to Geek, How to Sync Specific Folders With Dropbox," downloaded from the internet http://www.howtogeek.com, Apr. 23, 2013, 5 pages.
International Search Report and Written Opinion for PCT/US2013/020267, Applicant: Box, Inc., dated May 7, 2013, 10 pages.
International Search Report and Written Opinion for PCT/US2011/060875 dated Oct. 30, 2012, pp. 1-10.
Internet Forums, http://web.archive.org/web/20100528195550/http://en.wikipedia.org/wiki/Internet_forums, Wikipedia, May 30, 2010, pp. 1-20.
Yahoo! Groups, http://web.archive.org/web/20090320101529/http://en.wikipedia.org/wiki/Yahoo!_Groups, Wikipedia, Mar. 20, 2009, pp. 1-6.
Cisco, "FTP Load Balancing on ACE in Routed Mode Configuration Example," DocWiki, Jun. 2011, 7 pages.
Palmer, "Load Balancing FTP Servers," BlogNav, Oct. 2008, 2 pages.
Wayback, "Wayback machine," Wayback, Jun. 1, 2011, 1 page.
Conner, "Google Apps: The Missing Manual," published by O'Reilly Media, May 27, 2008, 24 pages.
U.S. Appl. No. 60/992,656, filed Dec. 5, 2007, Methods and Systems for Open Source Collaboration in an Application Service Provider Environment.
U.S. Appl. No. 61/055,901, filed May 23, 2008, Methods and Systems for Open Source Integration.
U.S. Appl. No. 12/260,533, (U.S. Pat. No. 8,326,814), filed Oct. 29, 2008, (Dec. 4, 2012), Methods and Systems for Open Source Integration.

(56) References Cited

OTHER PUBLICATIONS

U.S. Appl. No. 13/030,090, (U.S. Pat. No. 8,140,513), filed Feb. 17, 2011, (Mar. 20, 2012), Methods and Systems for Open Source Collaboration in an Application Service Provider Environment.
U.S. Appl. No. 13/412,549, (U.S. Pat. No. 8,583,619), filed Mar. 5, 2012, (Nov. 12, 2013), Methods and Systems for Open Source Collaboration in an Application Service Provider Environment.
U.S. Appl. No. 13/646,339, filed Oct. 5, 2012, File Management System and Collaboration Service and Integration Capabilities With Third Party Applications.
U.S. Appl. No. 14/073,502, filed Nov. 6, 2013, Methods and Systems for Open Source Collaboration in an Application Service Provider Environment.
U.S. Appl. No. 61/434,810, filed Jan. 20, 2011, Real Time Notifications of Activity and Real-Time Collaboration in a Cloud-Based Environment With Applications in Enterprise Settings.
U.S. Appl. No. 13/152,982, filed Jun. 3, 2011, Real Time Notification of Activities that Occur in a Web-Based Collaboration Environment.
U.S. Appl. No. 13/166,733, filed Jun. 22, 2011, Multimedia Content Preview Rendering in a Cloud Content Management System.
U.S. Appl. No. 61/551,894, filed Oct. 26, 2011, Enhanced Multimedia Content Preview Rendering in a Cloud Content Management System.
U.S. Appl. No. 13/590,012, filed Aug. 20, 2012, Preview Pre-Generation Based on Heuristics and Algorithmic Prediction/Assessment of Predicted User Behavior for Enhancement of User Experience.
U.S. Appl. No. 13/297,230, filed Nov. 15, 2011, Enhanced Multimedia Content Preview Rendering in a Cloud Content Management.
U.S. Appl. No. 61/592,567, filed Jan. 30, 2012, Preview Pre-Generation Based on Heuristics and Algorithmic Prediction/Assessment of Predicted User Behavior for Enhancement of User Experience.
U.S. Appl. No. 61/506,013, filed Jul. 8, 2011, Collaboration Sessions in a Workspace on a Cloud-Based Content Management System.
U.S. Appl. No. 61/592,394, filed Jan. 30, 2012, Extended Applications of Multimedia Content Previews in the Cloud-Based Content Management System.
U.S. Appl. No. 13/588,356, filed Aug. 17, 2012, Extended Applications of Multimedia Content Previews in the Cloud-Based Content Management System.
U.S. Appl. No. 13/274,268, (U.S. Pat. No. 8,515,902), filed Oct. 14, 2011, (Aug. 20, 2013, Automatic and Semi-Automatic Tagging Features of Work Items in a Shared Workspace for Metadata Tracking in a Cloud-Based Content Management System With Selective or Optional User Contribution.
U.S. Appl. No. 13/968,357, filed Aug. 15, 2013, Automatic and Semi-Automatic Tagging Features of Work Items in a Shared Workspace for Metadata Tracking in a Cloud-Based Content Management System With Selective or Optional User Contribution.
U.S. Appl. No. 61/538,782, filed Sep. 23, 2011, Central Management and Control of User-Contributed Content in a Web-Based Collaboration Environment and Management Console Thereof.
U.S. Appl. No. 13/547,264, filed Jul. 12, 2012, Central Management and Control of User-Contributed Content in a Web-Based Collaboration Environment and Management Console Thereof.
U.S. Appl. No. 13/165,725, filed Jun. 21, 2011, Batch Uploading of Content to a Web-Based Collaboration Environment.
U.S. Appl. No. 61/505,999, filed Jul. 11, 2011, Desktop Application for Access and Interaction with Workspaces in a Cloud-Based Content Management System and Synchronization Mechanisms Thereof.
U.S. Appl. No. 13/282,427, filed Oct. 26, 2011, Desktop Application for Access and Interaction with Workspaces in a Cloud-Based Content Management System and Synchronization Mechanisms Thereof.
U.S. Appl. No. 61/554,450, filed Nov. 1, 2011, Platform and Application Independent Method for Document Editing and Version Tracking Via a Web Browser.
U.S. Appl. No. 13/332,319, filed Dec. 20, 2011, Platform and Application Independent System and Method for Networked File Access and Editing.
U.S. Appl. No. 13/414,480, filed Mar. 7, 2012, Universal File Type Preview for Mobile Devices.
U.S. Appl. No. 61/564,425, filed Nov. 29, 2011, Mobile Platform Folder Synchronization and Offline Synchronization.
U.S. Appl. No. 61/568,430, filed Dec. 8, 2011, Mobile Platform File and Folder Selection Functionalities for Offline Access and Synchronization.
U.S. Appl. No. 13/689,544, filed Nov. 29, 2012, Mobile Platform File and Folder Selection Functionalities for Offline Access and Sychronization.
U.S. Appl. No. 13/345,502, filed Jan. 6, 2012, System and Method for Actionable Event Generation for Task Delegation and Management via a Discussion Forum in a Web-Based Collaboration Environment.
U.S. Appl. No. 13/619,439, filed Sep. 14, 2012, Batching Notifications of Activities That Occur in a Web-Based Collaboration Environment.
U.S. Appl. No. 61/560,685, filed Nov. 16, 2011, Temporal and Spatial Processing and Tracking of Events in a Web-Based Collaboration Environment for Asynchronous Delivery in an Ordered Fashion.
U.S. Appl. No. 13/524,501, filed Jun. 15, 2012, Resource Effective Incremental Updating of a Remote Client With Events Which Occurred Via a Cloud-Enabled Platform.
U.S. Appl. No. 13/526,437, filed Jun. 18, 2012, Managing Updates at Clients Used by a User to Access a Cloud-Based Collaboration Service.
U.S. Appl. No. 61/579,551, filed Dec. 22, 2011, System Status Monitoring and Data Health Checking in a Collaborative Environment.
U.S. Appl. No. 13/464,813, filed Apr. 4, 2012, Health Check Services for Web-Based Collaboration Environments.
U.S. Appl. No. 13/405,164, filed Feb. 24, 2012, System and Method for Promoting Enterprise Adoption of a Web-Based Collaboration Environment.
U.S. Appl. No. 13/431,645, filed Mar. 27, 2012, Cloud Service or Storage Use Promotion Via Partnership Driven Automatic Account Upgrades.
U.S. Appl. No. 61/620,554, filed Apr. 5, 2012, Device Pinning Capability for Enterprise Cloud Service and Storage Accounts.
U.S. Appl. No. 13/493,922, filed Jun. 11, 2012, Device Pinning Capability for Enterprise Cloud Service and Storage Accounts.
U.S. Appl. No. 61/649,869, filed Mar. 21, 2012, Selective Application Access Control Via a Cloud-Based Service for Security Enhancement.
U.S. Appl. No. 13/493,783, filed Jun. 11, 2012, Security Enhancement Through Application Access Control.
U.S. Appl. No. 61/702,948, filed Sep. 19, 2012, Cloud-Based Platform Enabled With Media Content Indexed for Text-Based Searches and/or Metadata Extraction.
U.S. Appl. No. 13/829,663, Mar. 14, 2013, Cloud-Based Platform Enabled With Media Content Indexed for Text-Based Searches and/or Metadata Extraction.
U.S. Appl. No. 61/702,662, filed Sep. 18, 2012, Sandboxing Individual Applications to Specific User Folders in a Cloud-Based Service.
U.S. Appl. No. 13/830,016, filed Mar. 14, 2013, Sandboxing Individual Applications to Specific User Folders in a Cloud-Based Service.
U.S. Appl. No. 61/620,568, filed Apr. 5, 2012, Synchronization Client Selective Subfolder Syncing in a Cloud-Based Environment.
U.S. Appl. No. 13/856,607, filed Apr. 4, 2013, Method and Apparatus for Selective Subfolder Synchronization in a Cloud-Based Environment.
U.S. Appl. No. 61/622,868, filed Apr. 11, 2012, Web and Desktop Client Synchronization of Mac Packages With a Cloud-Based Platform.

(56) References Cited

OTHER PUBLICATIONS

U.S. Appl. No. 13/618,993, filed Sep. 14, 2012, Cloud Service Enabled to Handle a Set of Files Depicted to a User as a Single File in a Native Operating System.
U.S. Appl. No. 61/643,116, filed May 4, 2012, Hbase Redundancy Implementation for Action Log Framework.
U.S. Appl. No. 13/890,172, filed May 8, 2013, Repository Redundancy Implementation of a System Which Incrementally Updates Clients With Events That Occurred Via a Cloud-Enabled Platform.
U.S. Appl. No. 13/888,308, filed May 6, 2013, Repository Redundancy Implementation of a System Which Incrementally Updates Clients With Events That Occurred Via a Cloud-Enabled Platform.
U.S. Appl. No. 61/693,521, filed Aug. 27, 2012, Backend Implementation of Synchronization Client Selective Subfolder Syncing in a Cloud-Based Environment.
U.S. Appl. No. 14/010,851, filed Aug. 27, 2013, Server Side Techniques for Reducing Database Workload in Implementing Selective Subfolder Synchronization in a Cloud-Based Environment.
U.S. Appl. No. 61/641,824, filed May 2, 2012, Platform and Application Agnostic Method for Seamless File Access in a Mobile Environment.
U.S. Appl. No. 61/650,840, filed May 23, 2012, Platform and Application Agnostic Method for Seamless File Access in a Mobile Environment.
U.S. Appl. No. 61/653,876, filed May 31, 2012, Platform and Application Agnostic Method for Seamless File Access in a Mobile Environment.
U.S. Appl. No. 13/886,147, filed May 2, 2013, System and Method for a Third-Party Application to Access Content Within a Cloud-Based Platform.
U.S. Appl. No. 13/897,421, filed May 19, 2013, Methods, Architectures and Security Mechanisms for a Third-Party Application to Access Content in a Cloud-Based Platform.
U.S. Appl. No. 13/898,200, filed May 20, 2013, Metadata Enabled Third-Party Application Access of Content at a Cloud-Based Platform Via a Native Client to the Cloud-Based Platform.
U.S. Appl. No. 13/898,242, filed May 20, 2013, Identification Verification Mechanisms for a Third-Party Application to Access Content in a Cloud-Based Platform.
U.S. Appl. No. 61/667,909, filed Jul. 3, 2012, Highly Available Ftp Servers for a Cloud-Based Service.
U.S. Appl. No. 13/565,136, filed Aug. 2, 2012, Load Balancing Secure Ftp Connections Among Multiple Ftp Servers.
U.S. Appl. No. 13/649,784, (U.S. Pat. No. 8,179,445), filed Oct. 11, 2012, (May 6, 2014), Highly Available Ftp Servers for a Cloud-Based Service.
U.S. Appl. No. 61/668,626, filed Jul. 6, 2012, Online Shard Migration.
U.S. Appl. No. 13/937,060, filed Jul. 8, 2013, System and Method for Performing Shard Migration to Support Functions of a Cloud-Based Service.
U.S. Appl. No. 61/668,698, filed Jul. 6, 2012, Identification of People as Search Results From Key-Word Based Searches of Content.
U.S. Appl. No. 13/937,101, filed Jul. 8, 2013, Identification of People as Search Results From Key-Word Based Searches of Content in a Cloud-Based Environment.
U.S. Appl. No. 61/668,794, filed Jul. 6, 2012, Systems and Methods for Specifying User and Item Identifiers Within an Email Address for Securely Submitting Comments Via Email.
U.S. Appl. No. 13/937,124, filed Jul. 8, 2013, Systems and Methods for Securely Submitting Comments Among Users Via External Messaging Applications in a Cloud-Based Platform.
U.S. Appl. No. 61/673,671, filed Jul. 19, 2012, Data Loss Prevention Methods and Architectures in a Cloud Service.
U.S. Appl. No. 13/944,184, filed Jul. 17, 2013, Data Loss Prevention (Dlp) Methods and Architectures by a Cloud Service.
U.S. Appl. No. 13/944,241, filed Jul. 17, 2013, Data Loss Prevention (Dlp) Methods by a Cloud Service Including Third Party Integration Architectures.
U.S. Appl. No. 61/694,492, filed Aug. 29, 2012, Method of Streaming File Encryption and Decryption to/From a Collaborative Cloud.
U.S. Appl. No. 13/975,827, filed Aug. 26, 2013, Method of Streaming File Encryption and Decryption to/From a Collaborative Cloud.
U.S. Appl. No. 61/701,823, filed Sep. 17, 2012, Use of a Status Bar Interface Element as a Handle for Revealing Additional Details.
U.S. Appl. No. 13/737,577, filed Jan. 9, 2013, System and Method of a Manipulative Handle in an Interactive Mobile User Interface.
U.S. Appl. No. 61/697,437, filed Sep. 6, 2012, Secure File Portability Between Mobile Applications Using a Server-Based Key Generation Service.
U.S. Appl. No. 13/776,358, filed Feb. 25, 2013, Secure File Portability Between Mobile Applications Using a Server-Based Key Generation Service.
U.S. Appl. No. 61/697,469, filed Sep. 6, 2012, Force Upgrade of a Mobile Application Via Server Side Configuration Files.
U.S. Appl. No. 13/776,467, filed Feb. 25, 2013, Force Upgrade of a Mobile Application Via Server Side Configuration File.
U.S. Appl. No. 61/697,477, filed Sep. 6, 2012, Disabling the Self-Referential Appearance of a Mobile Application in an Intent Via a Background Registration.
U.S. Appl. No. 13/794,401, filed Mar. 11, 2013, Disabling the Self-Referential Appearance of a Mobile Application in an Intent Via a Background Registration.
U.S. Appl. No. 61/697,511, filed Sep. 6, 2012, Channel for Opening and Editing Files From a Cloud Service Provider Based on Intents.
U.S. Appl. No. 13/776,535, filed Feb. 25, 2013, System and Method for Creating a Secure Channel for Inter-Application Communication Based on Intents.
U.S. Appl. No. 61/694,466, filed Aug. 12, 2012, Optimizations for Client and/or Server Feedback Information Enabled Real Time or Near Real Time Enhancement of Upload/Download Performance.
U.S. Appl. No. 61/702,154, filed Sep. 17, 2012, Optimizations for Client and/or Server Feedback Information Enabled Real Time or Near Real Time Enhancement of Upload/Download Performance.
U.S. Appl. No. 61/703,699, filed Sep. 20, 2012, Optimizations for Client and/or Server Feedback Information Enabled Real Time or Near Real Time Enhancement of Upload/Download Performance.
U.S. Appl. No. 13/969,474, (U.S. Pat. No. 8,745,267), filed Aug. 16, 2013, (Jun. 3, 2014), Client-Server Fast Upload and Download Feedback Optimizers.
U.S. Appl. No. 14/293,685, filed Jun. 2, 2014, Enhancement of Upload and/or Download Performance Based on Client and/or Server Feedback Information.
U.S. Appl. No. 61/751,578, filed Jan. 11, 2013, Functionalities, Features, and User Interface of a Synchronization Client to a Cloud-Based Environment.
U.S. Appl. No. 14/153,726, filed Jan. 13, 2014, Functionalities, Features, and User Interface of a Synchronization Client to a Cloud-Based Environment.
U.S. Appl. No. 61/715,208, filed Oct. 17, 2012, Adaptive Architectures for Encryption Key Management in a Cloud-Based Environment.
U.S. Appl. No. 14/056,899, filed Oct. 17, 2013, Remote Key Management in a Cloud-Based Environment.
U.S. Appl. No. 61/709,086, filed Oct. 2, 2012, Visibility, Access Control, Advanced Reporting Api, and Enhanced Data Protection and Security Mechanisms for Administrators in an Enterprise.
U.S. Appl. No. 14/044,261, filed Oct. 2, 2013, System and Method for Enhanced Security and Management Mechanisms for Enterprise Administrators in a Cloud-Based Environment.
U.S. Appl. No. 61/709,653, filed Oct. 4, 2012, Corporate User Discovery and Identification of Recommended Collaborators in a Cloud Platform.
U.S. Appl. No. 14/046,294, filed Oct. 4, 2013, Corporate User Discovery and Identification of Recommended Collaborators in a Cloud Platform.
U.S. Appl. No. 61/709,866, filed Oct. 4, 2012, Enhanced Quick Search Features, Low-Barrier Commenting/Interactive Features in a Collaboration Platform.

(56) References Cited

OTHER PUBLICATIONS

U.S. Appl. No. 14/046,523, filed Oct. 4, 2013, Enhanced Quick Search Features, Low-Barrier Commenting/Interactive Features in a Collaboration Platform.
U.S. Appl. No. 61/709,407, filed Oct. 4, 2012, Seamless Access, Editing, and Creation of Files in a Web Interface or Mobile Interface to a Cloud Platform.
U.S. Appl. No. 14/046,726, filed Oct. 4, 2013, Seamless Access, Editing, and Creation of Files in a Web Interface or Mobile Interface to a Collaborative Cloud Platform.
U.S. Appl. No. 61/710,182, filed Oct. 5, 2012, Embedded Html Folder Widget for Accessing a Cloud Collaboration Platform and Content From Any Site.
U.S. Appl. No. 14/047,223, filed Oct. 7, 2013, System and Method for Generating Embeddable Widgets Which Enable Access to a Cloud-Based Collaboration Platform.
U.S. Appl. No. 61/750,474, filed Jan. 9, 2013, File System Event Monitor and Event Filter Pipeline for a Cloud-Based Platform.
U.S. Appl. No. 14/149,586, filed Jan. 7, 2014, File System Monitoring in a System Which Incrementally Updates Clients With Events That Occurred in a Cloud-Based Collaboration Platform.
U.S. Appl. No. 61/753,761, Conflict Resolution, Retry Condition Management, and Handling of Problem Files for the Synchronization Client to a Cloud-Based Platform.
U.S. Appl. No. 14/158,626, Conflict Resolution, Retry Condition Management, and Handling of Problem Files for the Synchronization Client to a Cloud-Based Platform.
U.S. Appl. No. 61/739,296, filed Dec. 19, 2012, Synchronization of Read-Only Files/Folders by a Synchronization Client With a Cloud-Based Platform.
U.S. Appl. No. 14/135,311, filed Dec. 19, 2013, Method and Apparatus for Synchronization of Items With Read-Only Permissions in a Cloud-Based Environment.
U.S. Appl. No. 61/748,399, filed Jan. 2, 2013, Handling Action Log Framework Race Conditions for a Synchronization Client to a Cloud-Based Environment.
U.S. Appl. No. 14/146,658, filed Jan. 2, 2014, Race Condition Handling in a System Which Incrementally Updates Clients With Events That Occurred in a Cloud-Based Collaboration Platform.
U.S. Appl. No. 61/822,170, filed May 10, 2013, Identification and Handling of Items to Be Ignored for Synchronization With a Cloud-Based Platform by a Synchronization Client.
U.S. Appl. No. 14/275,890, filed May 13, 2014, Identification and Handling of Items to Be Ignored for Synchronization With a Cloud-Based Platform by a Synchronization Client.
U.S. Appl. No. 61/822,191, filed May 10, 2013, Systems and Methods for Depicting Item Synchronization With a Cloud-Based Platform by a Synchronization Client.
U.S. Appl. No. 14/275,401, filed May 12, 2014, Top Down Delete or Unsynchronization on Delete of and Depiction of Item Synchronization With a Synchronization Client to a Cloud-Based Platform.
U.S. Appl. No. 61/834,756, filed Jun. 13, 2013, Systems and Methods for Event Building, Collapsing, or Monitoring by a Synchronization Client of a Cloud-Based Platform.
U.S. Appl. No. 14/304,038, filed Jun. 13, 2014, Systems and Methods for Synchronization Event Building and/or Collapsing by a Synchronization Component of a Cloud-Based Platform.
U.S. Appl. No. 61/838,176, filed Jun. 21, 2013, Maintaining and Updating File System Shadows on a Local Device by a Synchronization Client of a Cloud- Based Platform.
U.S. Appl. No. 14/312,482, filed Jun. 23, 2014, Maintaining and Updating File System Shadows on a Local Device by a Synchronization Client of a Cloud-Based Platform.
U.S. Appl. No. 61/839,325, filed Jun. 23, 2013, Systems and Methods for Improving Performance of a Cloud-Based Platform.
U.S. Appl. No. 14/314,887, filed Jun. 25, 2014, Systems and Methods for Managing Upgrades, Migration of User Data and Improving Performance of a Cloud-Based Platform.
U.S. Appl. No. 61/839,331, filed Jun. 25, 2013, Systems and Methods for Providing Shell Communication in a Cloud-Based Platform.
U.S. Appl. No. 14/314,677, filed Jun. 25, 2014, Systems and Methods for Providing Shell Communication in a Cloud-Based Platform.
U.S. Appl. No. 13/954,680, filed Jul. 30, 2013, System and Method for Advanced Control Tools for Administrators in a Cloud-Based Service.
U.S. Appl. No. 61/860,050, filed Jul. 30, 2013, Scalability Improvement in a System Which Incrementally Updates Clients With Events That Occurred in a Cloud-Based Collaboration Platform.
U.S. Appl. No. 14/194,091, filed Feb. 28, 2014, Scalability Improvement in a System Which Incrementally Updates Clients With Events That Occurred in a Cloud-Based Collaboration Platform.
U.S. Appl. No. 13/953,668, filed Jul. 29, 2013, System and Method for Advanced Search and Filtering Mechanisms for Enterprise Administrators in a Cloud-Based Environment.
U.S. Appl. No. 14/026,674, filed Sep. 13, 2013, Configurable Event-Based Automation Architecture for Cloud-Based Collaboration Platforms.
U.S. Appl. No. 61/877,917, filed Sep. 13, 2013, Systems and Methods for Configuring Event-Based Automation in Cloud-Based Collaboration Platforms.
U.S. Appl. No. 14/075,849, filed Nov. 8, 2013, Systems and Methods for Configuring Event-Based Automation in Cloud-Based Collaboration Platforms.
U.S. Appl. No. 14/027,149, filed Sep. 13, 2013, Simultaneous Editing/Accessing of Content by Collaborator Invitation Through a Web-Based or Mobile Application to a Cloud-Based Collaboration Platform.
U.S. Appl. No. 14/042,473, filed Sep. 30, 2013, Simultaneous Editing/Accessing of Content by Collaborator Invitation Through a Web-Based or Mobile Application to a Cloud-Based Collaboration Platform.
U.S. Appl. No. 14/026,837, filed Sep. 13, 2013, Mobile Device, Methods and User Interfaces Thereof in a Mobile Device Platform Featuring Multifunctional Access and Engagement in a Collaborative Environment Provided by a Cloud-Based Platform.
U.S. Appl. No. 14/166,414, filed Jan. 28, 2014, System and Method of a Multi-Functional Managing User Interface for Accessing a Cloud-Based Platform Via Mobile Devices.
U.S. Appl. No. 14/027,147, filed Sep. 13, 2013, System and Method for Rendering Document in Web Browser or Mobile Device Regardless of Third-Party Plug-In Software.
U.S. Appl. No. 61/877,938, filed Sep. 13, 2013, High Availability Architecture for a Cloud-Based Concurrent-Access Collaboration Platform.
U.S. Appl. No. 14/474,507, filed Sep. 2, 2014, High Availability Architecture for a Cloud-Based Concurrent-Access Collaboration Platform.
U.S. Appl. No. 61/894,340, filed Oct. 22, 2013, Desktop Application for Accessing a Cloud Collaboration Platform.
U.S. Appl. No. 14/521,134, filed Oct. 22, 2014, Desktop Application for Accessing a Cloud Collaboration Platform.
U.S. Appl. No. 14/472,540, filed Aug. 29, 2014, Enhanced Remote Key Management for an Enterprise in a Cloud-Based Environment.
U.S. Appl. No. 14/474,008, filed Aug. 28, 2014, Configurable Metadata-Based Automation and Content Classification Architecture for Cloud-Based Collaboration Platforms.
"Average Conversion Time for a D60 RAW file?" http://www.dpreview.com, Jul. 22, 2002, 4 pages.
Burns, "Developing Secure Mobile Applications for Android," Oct. 2008, Version 1.0, 1-28 pages.
Comes, "MediaXchange Users Manual," Version 1.15.15, Feb. 1, 2009, pp. 1-90.
Exam Report for GB1308842.2, Applicant: Box, Inc. dated Mar. 10, 2014, 4 pages.
Search Report for EP 11729851.3, Applicant: Box, Inc. dated Feb. 7, 2014, 9 pages.

(56) References Cited

OTHER PUBLICATIONS

"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the internet, http://web. Archive.org/web, 3 pages.
"Tulsa TechFest 2012—Agenda," retrieved from the website, http://web.archive.org, Oct. 2, 2012, 2 pages.
Cohen, "Debating the Definition of Cloud Computing Platforms," retrieved from the internet, http://forbes.com, Feb. 3, 2014, 7 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13177108.1, Applicant: Box, Inc. dated May 26, 2014, 6 pages.
Exam Report for GB1312264.3, Applicant: Box, Inc. dated Mar. 24, 2014, 7 pages.
Exam Report for GB1318792.7, Applicant: Box, Inc. dated May 22, 2014, 2 pages.
John et al., "Always Sync Support Forums—View topic—Allway sync funny behavior," Allway Sync Support Forum at http://sync-center.com, Mar. 28, 2011, XP055109680, 2 pages.
Partial Search Report for EP131832800, Applicant: Box, Inc. dated May 8, 2014, 5 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP13187217.8, Applicant: Box, Inc. dated Apr. 15, 2014, 12 pages.
Search Report for EP141509422, Applicant: Box, Inc. dated May 8, 2014, 7 pages.
Search Report for EP14151588.2, Applicant: Box, Inc. dated Apr. 15, 2014, 12 pages.
Search Report for EP14153783.7, Applicant: Box, Inc. dated Apr. 3, 2014, 6 pages.
Sommerer, "Presentable Document Format: Improved On-demand PDF to HTML Conversion," retrieved from the internet, http://research.microsoft.com, 8 pages.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
Exam Report for GB1316682.2 Applicant: Box, Inc. dated Nov. 19, 2014, 6 pages.
Exam Report for GB1312095.1 Applicant: Box, Inc. dated Nov. 19, 2014, 5 pages.
Exam Report for GB1313559.5 Applicant: Box, Inc. dated Nov. 4, 2014, 2 pages.
User's Guide for SMART Board Software for Windows, published Dec. 2004, 90 pages.
Zambonini et al., "Automated Measuring of Interaction with User Interfaces," Published as WO2007113573 Oct. 2007, 19 pages.
Exam Report for GB1309209.3 Applicant: Box, Inc. dated Jan. 19, 2015, 6 pages.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.

Exam Report for EP 13177108.1, Applicant: Box, Inc. dated Feb. 17, 2015, 6 pages.
Exam Report for GB1312264.3 Applicant: Box, Inc. dated Jan. 30, 2015, 5 pages.
Exam Report for GB1312874.9 Applicant: Box, Inc. dated Feb. 10, 2015, 7 pages.
Exam Report for GB1316685.5 Applicant: Box, Inc. dated Feb. 17, 2015, 5 pages.
Exam Report for EP 13185269.1, Applicant: Box, Inc. dated Feb. 13, 2015, 8 pages.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
Exam Report for EP13168784,0, Applicant: Box, Inc. dated Nov. 21, 2013, 7 pages.
Exam Report for GB1309209.3, Applicant: Box, Inc. dated Oct. 30, 2013, 11 pages.
Exam Report for GB1310666.1, Applicant: Box, Inc. dated Aug. 30, 2013, 10 pages.
Exam Report for GB1311417.8, Applicant: Box, Inc. dated Dec. 20, 2013, 5 pages.
Exam Report for GB1312095.1, Applicant: Box, Inc. dated Dec. 12, 2013, 7 pages.
Exam Report for GB1312874.9, Applicant: Box, Inc. dated Dec. 20, 2013, 11 pages.
Exam Report for GB1313559.5, Applicant: Box, Inc., dated Aug. 22, 2013, 19 pages.
Exam Report for GB1316532.9, Applicant: Box, Inc. dated Oct. 31, 2013, 10 pages.
Exam Report for GB1316533.7, Applicant: Box, Inc. dated Oct. 8, 2013, 9 pages.
Exam Report for GB1316971.9, Applicant: Box, Inc. dated Nov. 26, 2013, 10 pages.
Exam Report for GB1317600.3, Applicant: Box, Inc. dated Nov. 21, 2013, 8 pages.
Exam Report for GB1318373.6, Applicant: Box, Inc. dated Dec. 17, 2013, 4 pages.
Exam Report for GB1320902.8, Applicant: Box, Inc. dated Dec. 20, 2013, 4 pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
International Search Report and Written Opinion for PCT/US2013/039782, Applicant: Box, Inc., dated Aug. 28, 2013, 15 pages.
Patent Court Document of Approved Judgment for GB0602349.3 and GB0623571.7; Mar. 3, 2009, 17 pages.
International Search Report and Written Opinion for PCT/US2013/034765, Applicant: Box, Inc., dated Jan. 20, 2014, 15 pages.
Exam Report for EP13185269.1, Applicant: Box, Inc. dated Jan. 28, 7 pages.
Exam Report for GB1314771.5, Applicant: Box, Inc. dated Feb. 17, 2014, 7 pages.
Exam Report for GB1410569.6 Applicant: Box, Inc. dated Jul. 11, 2014, 9 pages.
Sommerer, "Presentable Document Format: Improved On-demand PDF to HTML Conversion," retrieved from the internet, http://research.microsoft.com, Nov. 2004, 8 pages.
Extended Search Report for EP131832800, Applicant: Box, Inc. dated Aug. 25, 2014, 7 pages.
Extended Search Report for EP141509422, Applicant: Box, Inc. dated Aug. 26, 2014, 12pages.
Search Report for EP 13189144.2 Applicant: Box, Inc. dated Sep. 1, 2014, 9 pages.
Exam Report for GB1312874.9 Applicant: Box, Inc. dated Sep. 26, 2014, 2 pages.

(56) References Cited

OTHER PUBLICATIONS

Exam Report for GB1415126.0 Applicant: Box, Inc. dated Oct. 2, 2014, 8 pages.
Exam Report for GB1415314.2 Applicant: Box, Inc. dated Oct. 7, 2014, 6 pages.
Exam Report for GB1309209.3 Applicant: Box, Inc. dated Oct. 7, 2014, 3 pages.
Exam Report for GB1315232.7 Applicant: Box, Inc. dated Oct. 9, 2014, 5 pages.
Exam Report for GB1318789.3 Applicant: Box, Inc. dated Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. dated Nov. 7, 2014, 6 pages.
Exam Report for GB1311417.8 Applicant: Box, Inc. dated Nov. 7, 2014, 2 pages.
Exam Report for GB1311421.0 Applicant: Box, Inc. dated Nov. 7, 2014, 4 pages.

* cited by examiner

FIG. 8

Department resources

Files [23]  People  Apps  My Account  🔍 Search All Files

Updates | Files | Tasks | Edit Folder | All Files > Marketing > Department resources ↑Upload +Create New ☐Discuss ☐Task  Prev 1 of 2 ▼ Next  Link  Send  Embed  Mobile Share an idea or link 15 Collaborators Mark Saldana previewed from a shared link:  Today at 3:04 PM
  newsletter_december_2010_final.png
  Created Dec 14, 2010 by You • 232.6KB David Lee
You
Creative Team [4]
Aaron Levie
Michael
Brandon Savage
Arnold Goldberg
Johnny
More collaborators [4]▶

Sean Lindo updated via Web Documents:  ...> Newsletter • Today at 2:50 PM
  Box Blog and Newsletter – Top 5 Roundup  Tasks  Shared ☐▷▶
  for 2010.webdoc
  Updated Dec 16, 2010 by Sean Lindo • 6.8KB
  Newsletter Enter email addresses here
Invite Collaborators Amy White previewed:  ...> V5 > Landing page • Today at 2:48 PM
  lp_V5-Ad-3.jpg  Tasks  Shared ☐▷▶
  Updated Dec 14, 2010 by Johnny • 108.7KB Resources:
Trash: 212.6 KB
Help articles
User forum discussions
Reports a problem Ashley Mayer previewed:  ...> Media relations > ABC Show • Today at 2:40 PM
  Phone Diagram.jpg
  Created Dec 16, 2010 by Ashley Mayer • 313.9KB 1210
1220

*FIG. 12*

COLLABORATION SESSIONS IN A WORKSPACE ON A CLOUD-BASED CONTENT MANAGEMENT SYSTEM

CROSS-REFERENCES TO RELATED APPLICATIONS

This application claims the benefit of U.S. Provisional Application No. 61/506,013, entitled "COLLABORATION SESSIONS IN A WORKSPACE ON A CLOUD-BASED CONTENT MANAGEMENT SYSTEM", filed Jul. 8, 2011, and is hereby incorporated by reference in its entirety.

This application is related to co-pending U.S. application Ser. No. 13/152,982, entitled, "REAL TIME NOTIFICATION OF ACTIVITIES THAT OCCUR IN A WEB-BASED COLLABORATION ENVIRONMENT", filed Jun. 3, 2011 and is incorporated in its entirety.

BACKGROUND

Online social networking sites are intended to provide a convenient way for members of the social networking service to interact and build social relationships. Often, a social networking site will provide an area for a social networking member to create a personal profile as well as an area for friends and other social networking members to leave comments for the owner of the profile. Each member can maintain his own profile and comments area and decide who can view the profile and leave comments.

BRIEF DESCRIPTION OF THE DRAWINGS

Examples of a web-based content management system with a collaboration environment that provides discussion workspaces linked to workspaces containing work items are illustrated in the figures. The examples and figures are illustrative rather than limiting.

FIG. 8 depicts a screenshot showing an example user interface for engaging in discussions on work items with collaborators in an online or web-based collaboration environment.

FIG. 12 shows a screenshot of another example user interface showing an event stream in a discussion workspace.

DETAILED DESCRIPTION

A system is described for generating a discussion workspace in a web-based content management system with a collaboration environment, where the discussion workspace is linked to a workspace or folder that contains work items. Collaborators with permissions to participate in the discussion workspace can start a topic of online discussion and/or leave comments for other collaborators of the workspace.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Figure 1:
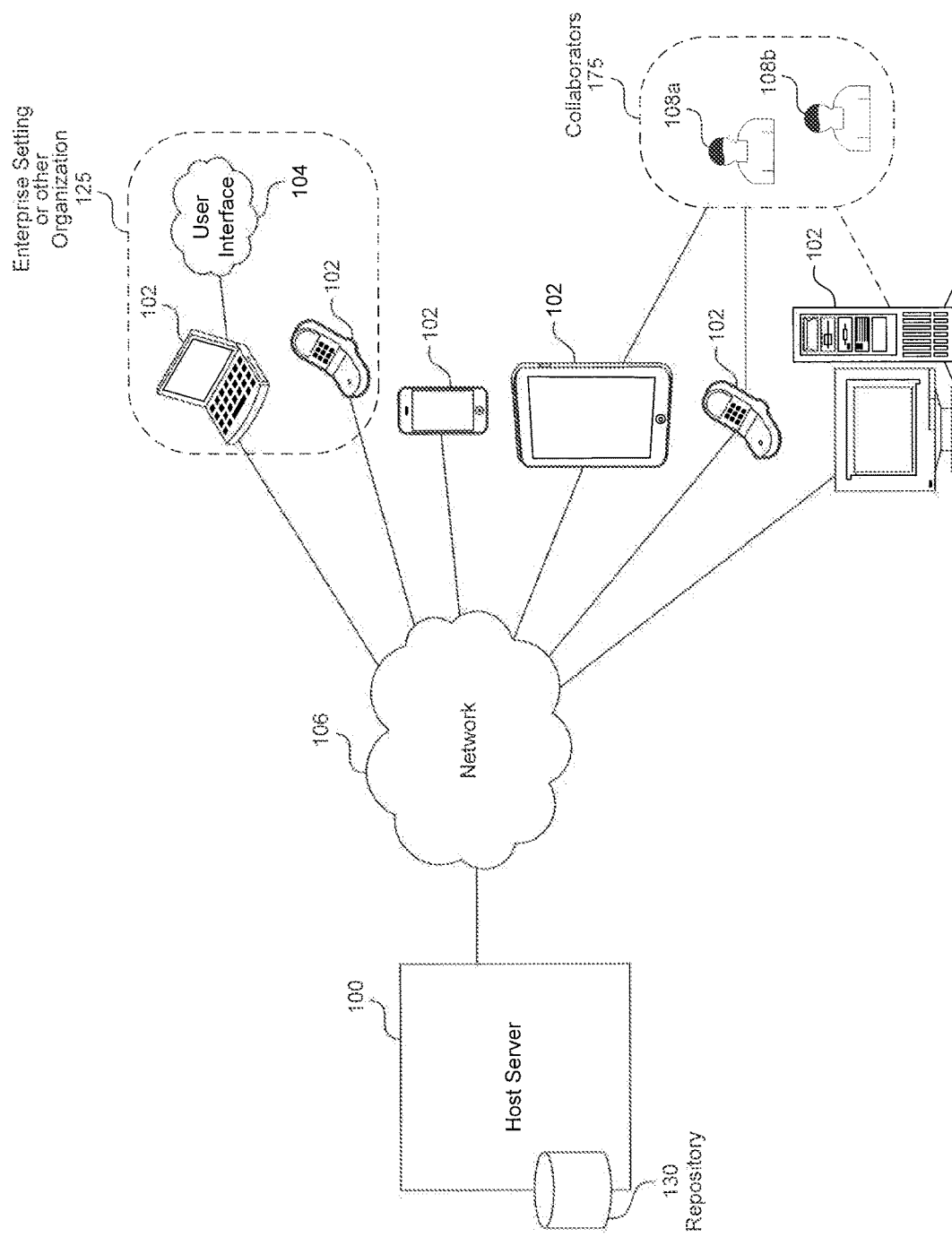
FIG. 1 illustrates an example diagram of a system where a host server supports discussion workspaces linked to folders or workspaces in an online collaboration environment.

FIG. 1 illustrates an example diagram of a system where a host server 100 supports discussion workspaces linked to folders or workspaces containing work items in a content management system with an online collaboration environment for users 108 associated with the respective workspaces. The content management system can generally be a cloud-based service.

The client devices 102 can be any system and/or device, and/or any combination of devices/systems that is able to establish a connection, including wired, wireless, cellular connections with another device, a server and/or other systems such as host server 100. Client devices 102 will typically include a display and/or other output functionalities to present information and data exchanged between or among the devices 102 and/or the host server 100.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. In one embodiment, the client devices 102 and host server 100 are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a web-based content management system with a collaboration environment or online collaboration platform (e.g., hosted by the host server 100).

The collaboration platform or environment hosts workspaces with work items stored in the data repository 130 that one or more users can access (e.g., view, edit, update, revise, comment, add to discussions, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc.

The data repository 130 is a database that can be managed by a database management system (DBMS), for example but not limited to, Oracle, DB2, Microsoft Access, Microsoft SQL Server, PostgreSQL, MySQL, FileMaker, etc. The data repository 130 can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

A workspace can generally refer to any grouping of a set of digital content in the collaboration platform. In general, the content management system permits a user to group stored files in a hierarchical manner, such that a workspace made up of a group of files can be contained within another workspace, such as a folder. The grouping can be created, identified, or specified by a user or through other means. This user may be a creator user or administrative user, for example. The workspace can also include an online discussion area for collaborators to engage in an online discussion.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may have different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such that each user can see, remotely, edits, revisions, comments, or annotations being made to specific work items through their own user devices. For example, a user can upload a document to a work space for other users to access (e.g., for viewing, editing, commenting, discussing, signing-off, or otherwise manipulating). The user can log in to the online platform and upload the document (or any other type of work item) to an existing work space or to a new work space. The document can be shared with existing users or collaborators in a work space.

Figure 2:
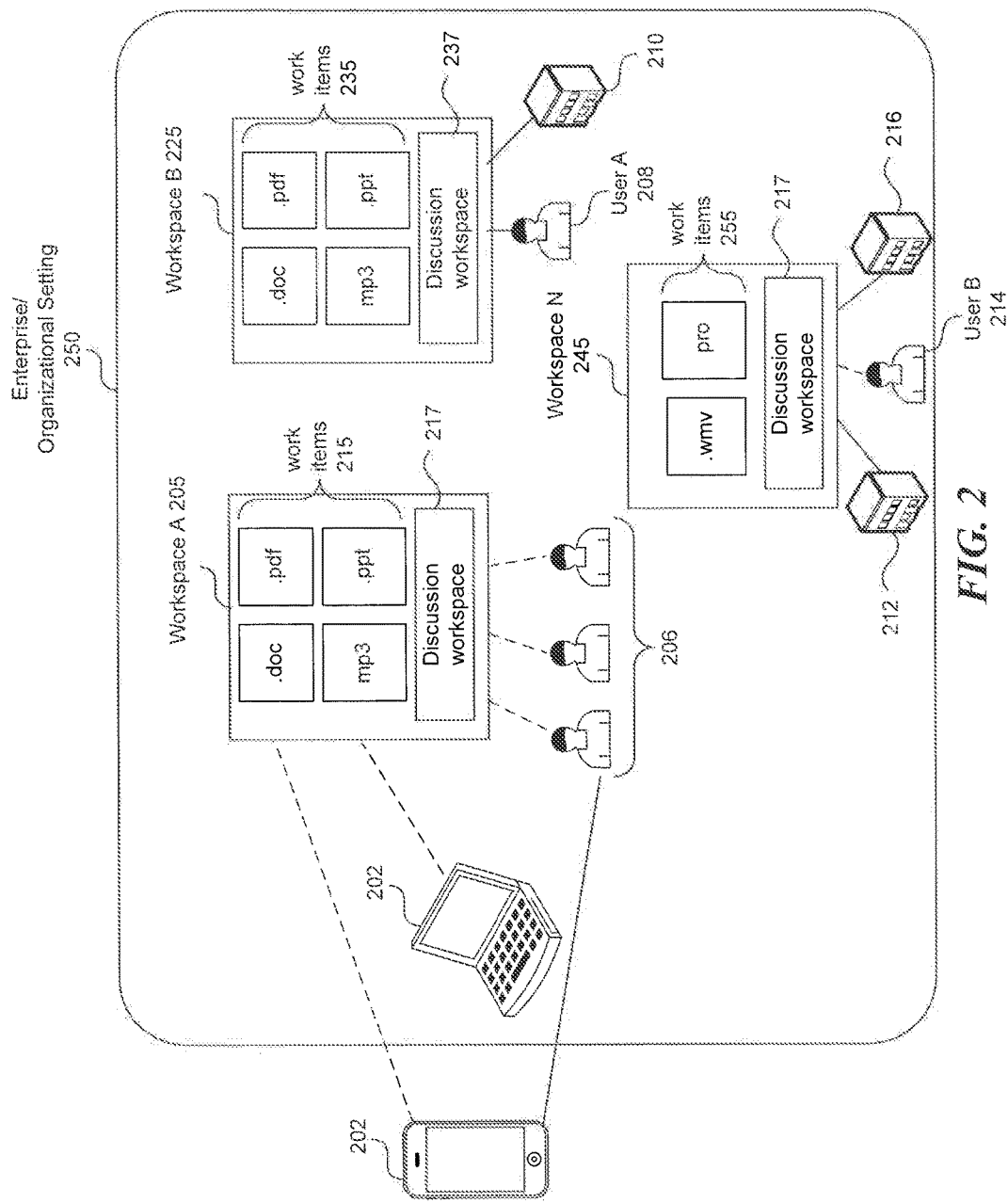
FIG. 2 depicts an example diagram of a web-based or online collaboration platform deployed in an enterprise or other organizational setting for organizing work items and workspaces.

A diagrammatic illustration of the online collaboration environment and the relationships between workspaces and users/collaborators are illustrated with further reference to the example of FIG. 2.

In one embodiment, discussions among collaborators of a workspace or folder can be linked to the particular workspace or folder, and collaborators can create topics for discussion and comment on those topics.

Functions and techniques disclosed for implementing discussions in the online platform linked to a work space can be performed by the host server 100 of the collaboration platform. Functions and techniques performed by the host server 100 and the related components therein are described, respectively, in detail with further reference to the example of FIG. 3.

In one embodiment, client devices 102 communicate with the host server 100 over network 106. In general, network 106, over which the client devices 102 and the host server 100 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

FIG. 2 depicts an example diagram of a web-based or online collaboration platform deployed in an enterprise or other organizational setting 250 for organizing workspaces 205, 225, 245 which include work items 215, 235, 255 and for providing a discussion workspace area 217, 237, 257 linked to the respective workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associated work items. For example, work space A 205 and discussion workspace 217 can be associated with work items 215, work space B 225 and discussion workspace 237 can be associated with work items 235, and work space N 245 and discussion workspace 237 can be associated with work items 255. The work items 215, 235, and 255 may be unique to each work space but need not be. For example, a particular document can be associated with only one work space (e.g., work space A 205) or it may be associated with multiple work spaces (e.g., work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208, and workspace N 245 can be associated with departments 212 and 216 and users shown as example user B 214.

Each user associated with a work space can generally access the work items associated with the work space. The level of access will depend on permissions associated with the specific work space, and/or with a specific work item. Permissions can be set for the work space or set individually on a per work item basis. For example, the creator of a work space (e.g., one of user A 208 who creates work space B) can set one permission setting applicable to all work items 235 for other associated users and/or users associated with the affiliate department 210, for example. Creator user A 208 may also set different permission settings for each work item, which may be the same for different users, or varying for different users.

In one embodiment, a first type of permission level, e.g. an editor, can allow a user to have full read and write access to a workspace such that the user can view and download contents of the workspace as well as upload new content to the workspace. A second type of permission level, e.g. a viewer, can allow a user to have full read access to a workspace such that the user can view and download contents of the workspace but not upload or edit contents of the workspace. A third type of permission level, e.g. an uploader, can allow a user to have limited write access to contents of a workspace such that the user can see items in the workspace but not download or view the items, while being permitted to upload new content to the workspace.

In one embodiment, the ability of a user associated with a workspace to contribute to a discussion workspace linked to that workspace or to invite others to join the workspace can be tied to the permission level of the user. For instance, an editor may be permitted to participate in the discussion workspace and invite other collaborators, while a viewer may only be allowed to participate in the discussion workspace, and an uploader may not be permitted to perform either action. Alternatively, separate discussion permission and/or invitation permission can be assigned by a creator or administrator of a workspace to individuals associated with the workspace. In some instances, discussion permission and/or invitation permission can be associated with the workspace or the items in the workspace or can be based upon any other criteria.

Figure 3:
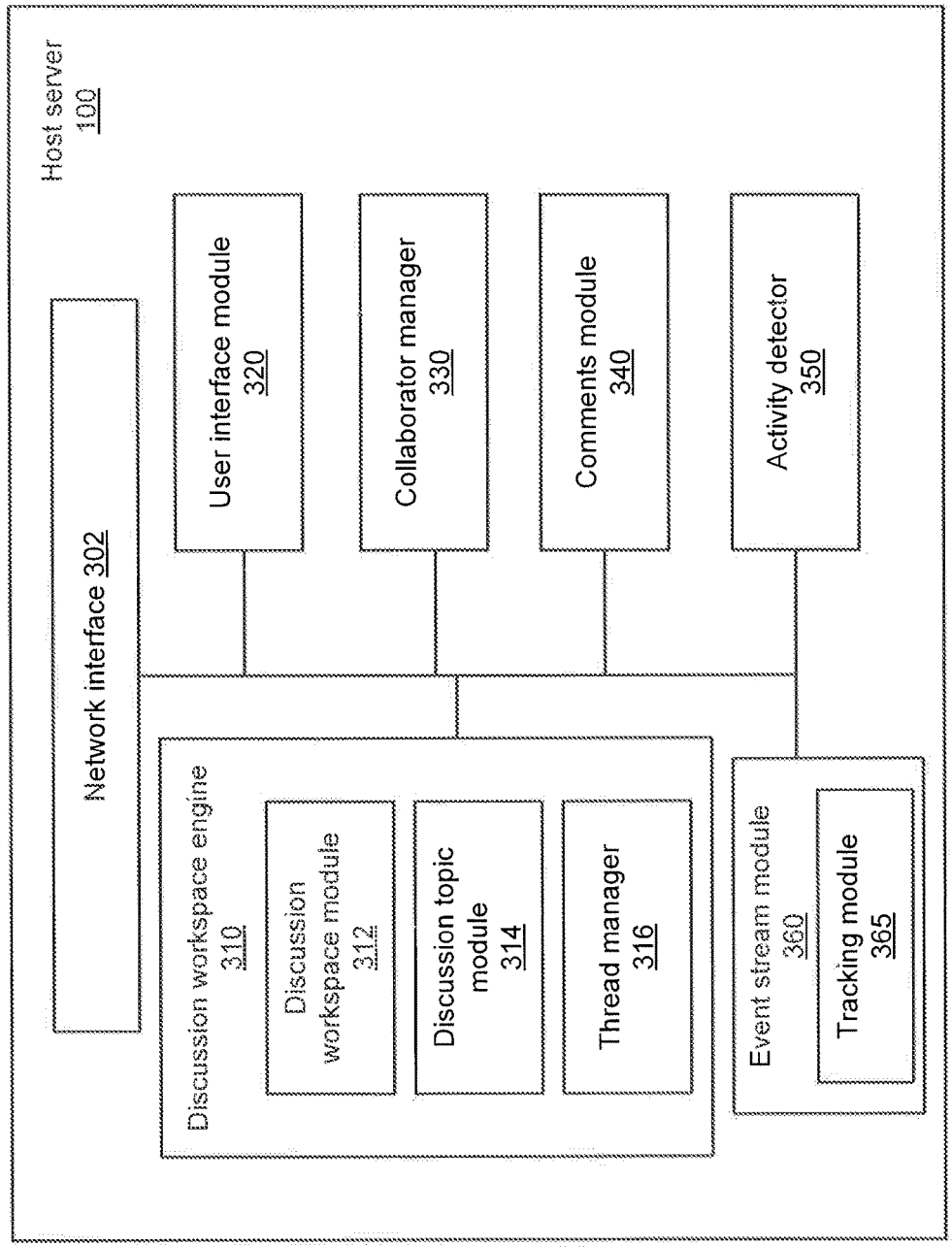
FIG. 3 depicts a block diagram illustrating an example of components in the host server of a web-based collaboration environment that provides discussion workspaces.

FIG. 3 shows a block diagram of an example host server 100 of a web-based collaboration environment that provides discussion workspaces linked to the workspaces in the collaboration environment.

The host server 100 of the web-based or online content management system with a collaboration environment can include, for example, a network interface 302, a discussion workspace engine 310, user interface module 320, a collaboration manager 330, a comments module 340, an activity detector 350, and an event stream module 360. The event stream module 360 can include a tracking module 365. The discussion workspace engine 310 can include a discussion workspace module 312, a discussion topic module 314, and a thread manager 316. Additional or fewer components/modules/engines can be included in the host server 100 and each illustrated component.

The network interface 302 can be a networking module that enables the host server 100 to mediate data in a network with an entity that is external to the host server 100, through any known and/or convenient communications protocol supported by the host and the external entity. The network interface 302 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

As used herein, a "module," "a manager," a "handler," a "detector," an "interface," or an "engine" includes a general purpose, dedicated or shared processor and, typically, firmware or software modules that are executed by the processor. Depending upon implementation-specific or other considerations, the module, manager, handler, or engine can be centralized or its functionality distributed. The module, manager, handler, or engine can include general or special purpose hardware, firmware, or software embodied in a computer-readable (storage) medium for execution by the processor. As used herein, a computer-readable medium or computer-readable storage medium is intended to include all media that are statutory (e.g., in the United States, under 35 U.S.C. 101), and to specifically exclude all media that are non-statutory in nature to the extent that the exclusion is necessary for a claim that includes the computer-readable (storage) medium to be valid. Known statutory computer-readable media include hardware (e.g., registers, random access memory (RAM), non-volatile (NV) storage, to name a few), but may or may not be limited to hardware.

One embodiment of the host server 100 includes a discussion workspace engine 310 that generates the discussion workspaces that enable collaborators to conduct online discussions. Discussion workspaces are intended to facilitate discussions relating to work items contained in the linked workspaces, but discussions need not be limited in such a manner.

In one embodiment, the workspaces in the web-based content management system with collaboration environment function similarly to folders in a folder-file hierarchy system where a user places related files or work items inside a folder or workspace, and multiple files and/or folders can be placed inside another folder or workspace, resulting in a folder tree organizational structure. Most users are familiar with the concept of a folder-file hierarchy system because many personal computers use the folder-file hierarchy system for organizing files. Thus, by mapping the concept of a collaborative workspace to the common mental model of folders, the learning gap for users of the collaboration environment is easily bridged.

In one embodiment, the discussion workspace engine 310 includes a discussion workspace module 312 that creates a separate discussion workspace for each folder workspace in the web-based collaboration environment. Further, the discussion workspace module 312 links each discussion workspace with its respective folder workspace so that users of a particular workspace find it intuitive to engage in communications in the linked discussion workspace regarding the items contained in the folder workspace. However, users are not limited to discussing only items in the associated workspace.

Figure 14:
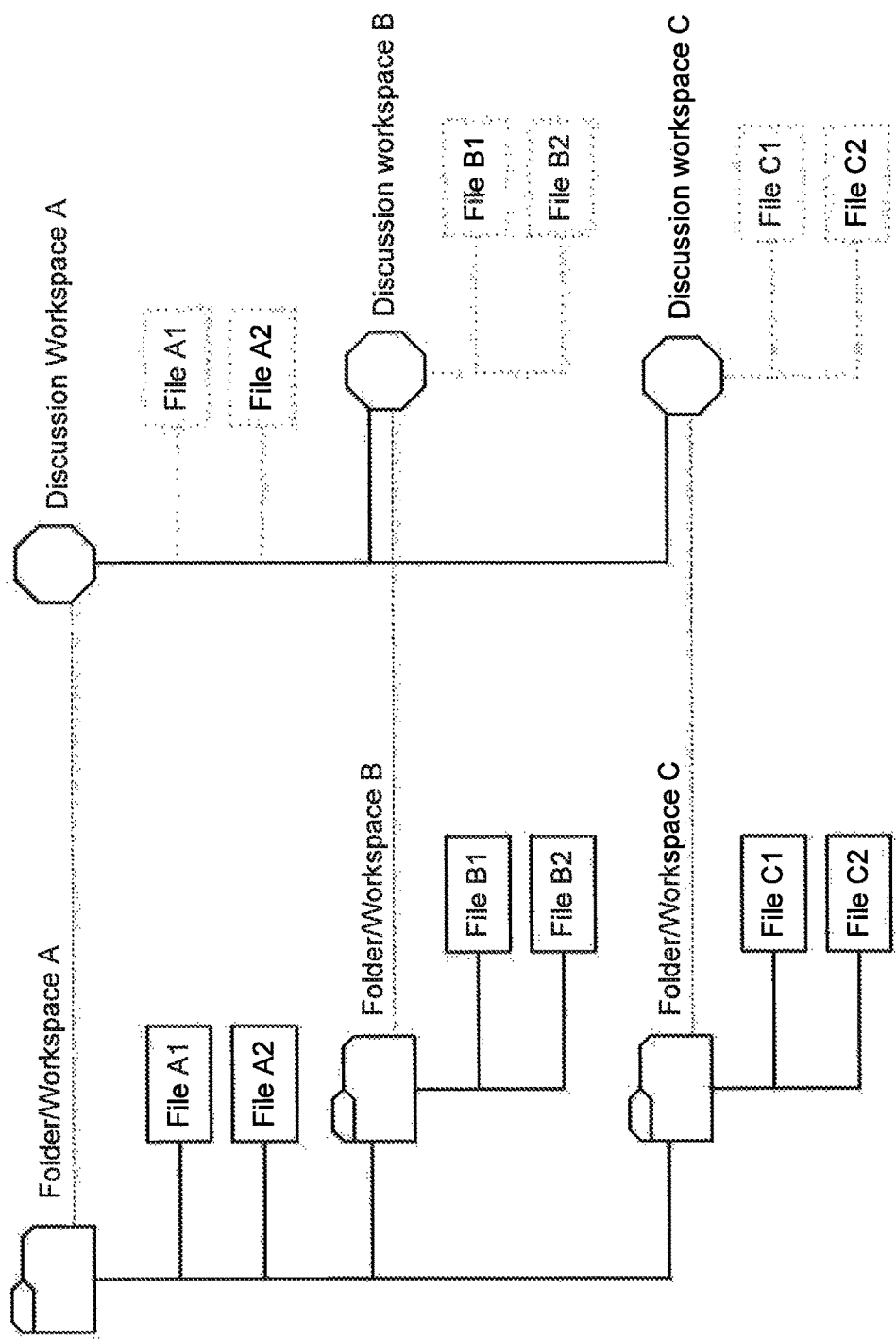
FIG. 14 shows an example of a folder-file hierarchy layout of folder/workspaces and their associated discussion workspaces.

FIG. 14 shows an example of a folder-file hierarchy layout of folder/workspaces and their associated discussion workspaces. The discussion workspaces are organized using the same folder-file hierarchy as the folder/workspaces. For example, folder/workspace A contains subfolder/workspace B and subfolder/workspace C. This hierarchy is paralleled by the discussion workspaces where discussion workspace A contains discussion workspace B and discussion workspace C. Further, folder/workspace A is associated with discussion workspace A, as shown by the dotted line connecting the two. Additionally, subfolder/workspace B is associated with discussion workspace B, and subfolder/workspace C is associated with discussion workspace C, also shown by dotted lines connecting the associated folder/workspaces and discussion workspaces. Thus, discussions relating to files A1 and A2 in folder/workspace A can take place in discussion workspace A; discussions relating to files B1 and B2 in subfolder/workspace B can take place in discussion workspace B; and discussions relating to files C1 and C2 in folder/workspace C can take place in discussion workspace C.

Figure 4:
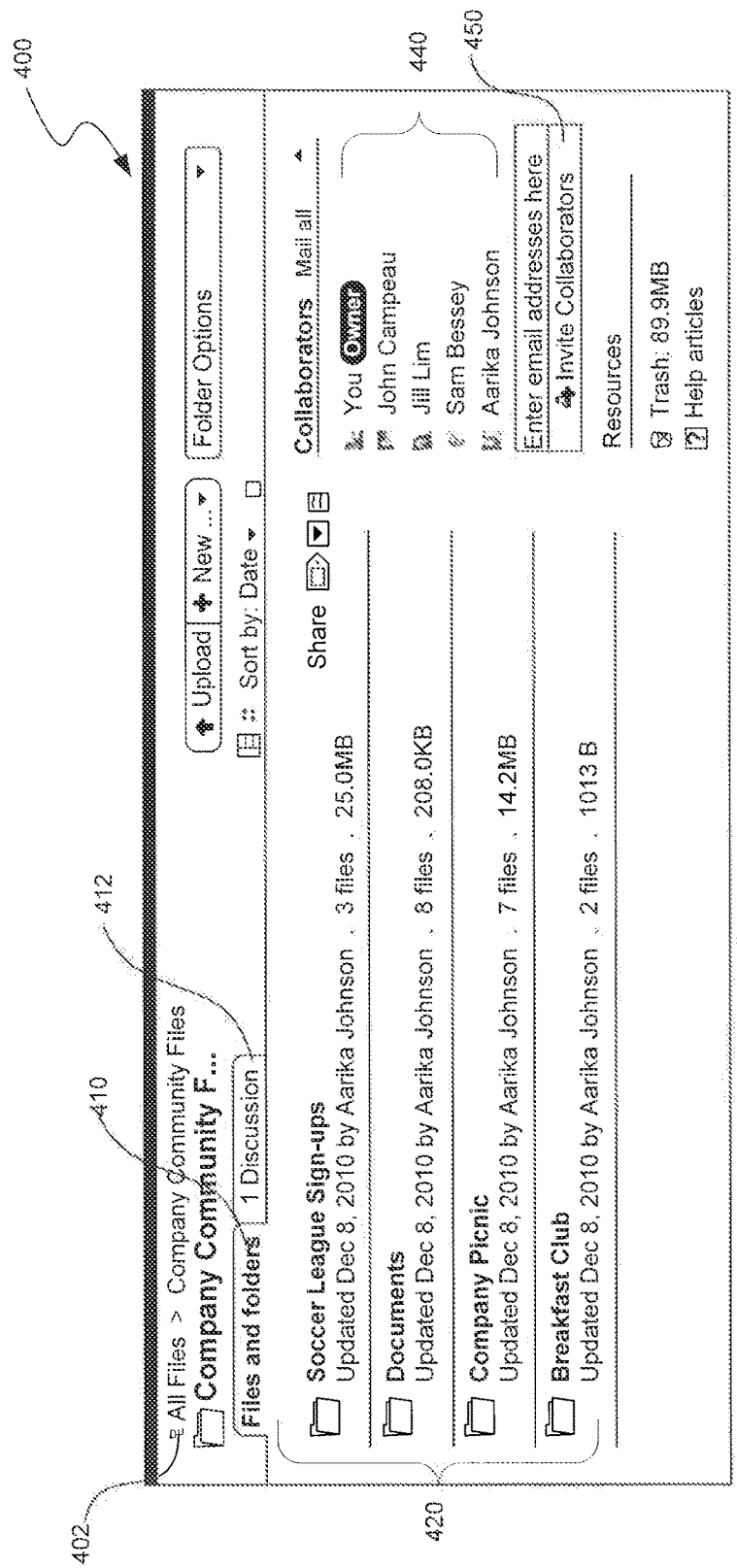
FIG. 4 depicts a screenshot of an example user interface that shows a tab for accessing a discussion workspace.

In one embodiment, the folder workspaces in the web-based collaboration environment and the linked discussion workspaces created by the discussion workspace module 312 can be presented to a user by the user interface module 320 as neighboring tabs on a web-browser screen. An example is shown in FIG. 4 where the contents of the folder entitled 'Company Community Files' is shown under the 'files and folders' tab 410, and next to the 'files and folders' tab 410 is the 'discussions' tab 412 that provides access to the linked discussion workspace. The user interface module 320 presents the comments submitted by collaborators of the workspace in the discussion area, and discussion topics submitted by collaborators can be used by collaborators to organize the displayed comments.

In one embodiment, discussions that take place in a discussion workplace that is linked to a child folder in the collaboration environment are also visible in the discussion workplace linked to the parent folder. So in the example layout shown in FIG. 14, discussions in discussion workspace B relating to files B1 and B2 in child folder/workspace B and in discussion workspace C relating to files C1 and C2 in child folder/workspace C are also shown in the parent discussion workspace A.

In one embodiment, the discussion workspace engine 310 includes a discussion topic module 314 that allows a user to create a new discussion topic. In one embodiment, prior to starting a new discussion in the discussion workspace, a user creates a new discussion topic and then enters his comments for communicating with his collaborators. Subsequent comments from other users associated with the workspace, also known as collaborators, can be replies to the first comment or new comments.

In one embodiment, the discussion workspace engine 310 includes a thread manager 316 that allows a user to reply to, edit, or delete a comment in a discussion workspace. Generally, the author of the comment, creator of the workspace, or designated administrator can edit or delete a comment.

In one embodiment, the host server 100 includes a collaborator manager 330 that tracks the permission levels of users. The term collaborator can refer to users who are given permission by a creator or administrator of a workspace to join that workspace. As discussed above, each collaborator of a workspace can be assigned a particular permission level or a default permission level. In one embodiment, when a collaborator of a workspace creates a sub-workspace within a parent workspace, the sub-workspace inherits each of the collaborators of the parent workspace, along with the permission levels of the collaborators in the parent workspace.

In one embodiment, the host server 100 includes a comments module 340 that creates a comments area linked with each file that is uploaded to the web-based content management system. Similar to the comments in the discussion workspace described above, comments associated with a file are limited to those with permission to leave a comment. Also, comments associated with a file can be maintained by the thread manager 316 which enables replies, editing, and deleting of file comments.

In one embodiment, the host server 100 includes an activity detector 350 that can detect an activity occurring in the web-based collaboration environment. Detected activities can be shown in an event stream in the linked discussion workspace. Activities can include any action related to a workspace, such as adding, deleting, or modifying a work item in the workspace or folder; adding, deleting, or modifying collaborators in the workspace; previewing or commenting on a work item; sharing a work item; emailing a link to a work item; adding, deleting, or modifying comments in the discussion workspace; and creating a discussion topic in the discussion workspace. In one embodiment, actions can be detected in real time or in near real time, and the event stream can be updated in real time or in near real time.

In one embodiment, the host server 100 includes an event stream module 360 that can receive detected activities with respect to work items in a workspace from the activity detector 350 and present the activities in an event stream in the associated discussion workspace. In one embodiment, activities that occur with respect to a child folder in the collaboration environment are also entered into the event stream of the parent folder. In one embodiment, the event stream module 360 can also send an email to collaborators notifying them of detected activities.

In one embodiment, the event stream module 360 includes the tracking module 365 which can track users of the web-based collaboration platform. In one embodiment, the tracking module 365 keeps track of when a user logs into the collaboration platform. When a user logs into the collaboration platform, the event stream module 360 sends a notification to the user about the latest new discussion topics or threads that have been started or discussion replies that have been generated since the last time the user logged into the collaboration platform. In some instances, the tracking module 365 marks a discussion as new until the user has read a discussion reply.

In one embodiment, the tracking module 365 keeps track of when a user goes to a specific folder where there is a discussion. When the user goes to that folder, the event stream module 360 sends a notification to the user about the latest new discussion topics or threads that have been started or discussion replies that have been generated since the last time the user visited that specific folder. In some instances, the tracking module 365 marks a discussion as new until the user has read a discussion reply.

In one embodiment, the tracking module 365 can track when a user has registered mobile device, and the event stream module 360 can send push notifications of detected activities, such as creation of a new discussion topic or a new discussion reply. Push notification is described in more detail in U.S. application Ser. No. 13/152,982, entitled, "REAL TIME NOTIFICATION OF ACTIVITIES THAT OCCUR IN A WEB BASED COLLABORATION ENVIRONMENT", filed Jun. 3, 2011 and is incorporated herein in its entirety.

FIG. 4 depicts a screenshot showing an example user interface 400 for use in accessing the discussion workspace of a workspace in a web-based collaboration environment.

In the example of FIG. 4, the folder-file hierarchy of stored information in the content management system 130 of the user is shown as item 402. Here, the root folder is called "All Files", and the root folder contains a folder or workspace called 'Company Community Files'. The screen shot shows the contents 420 of this folder under the tab 410 called 'Files and folders', namely four folders or workspaces. The collaborators 440 of the "Company Community Files" workspace are shown on the right. The user is shown to be the owner, and the other collaborators may have different access permissions. The button 450 can be used by the user to invite further collaborators to join the workspace.

The 'discussions' tab 412 shown next to the 'Files and Folders' tab 410 indicates that one discussion has been started. The discussions under this tab are linked to the 'Files and folders' workspace. Any collaborator 440 can go to the 'discussions' tab 412 to start or join a discussion about any item in the linked 'Files and folders' workspace, provided the collaborator has the appropriate permission level to participate in a discussion. The linked discussion workspace is intended primarily for online conversations relating to the contents of the 'company Community Files' folder, although other comments can also be left as part of the ongoing discussion.

If the account holder of the displayed folder tree is only engaged in a small number of collaborations, the discussions can all be accessed and easily managed through the single, centralized 'discussions' tab 412.

In another scenario, if the account holder has a large number of ongoing collaborations, the online discussions can be filtered and more manageably organized by maintaining focused communications in each of the discussion workspaces linked to a specific sub-folder. In the example of FIG. 4, clicking on the sub-folder 'Soccer League Sign-Ups' would show the files and folders contained in this sub-folder under its own 'files and folders' tab. And next to the 'files and folders' tab would be a 'discussions' tab that is linked to the 'Soccer League Sign-Ups' workspace. Thus, the discussions related to this second-level folder can be focused just on work items in this workspace. By linking discussion workspaces to folders or hierarchical workspaces, discussions are automatically organized in the same manner as the folder workspaces are organized.

Figure 5:
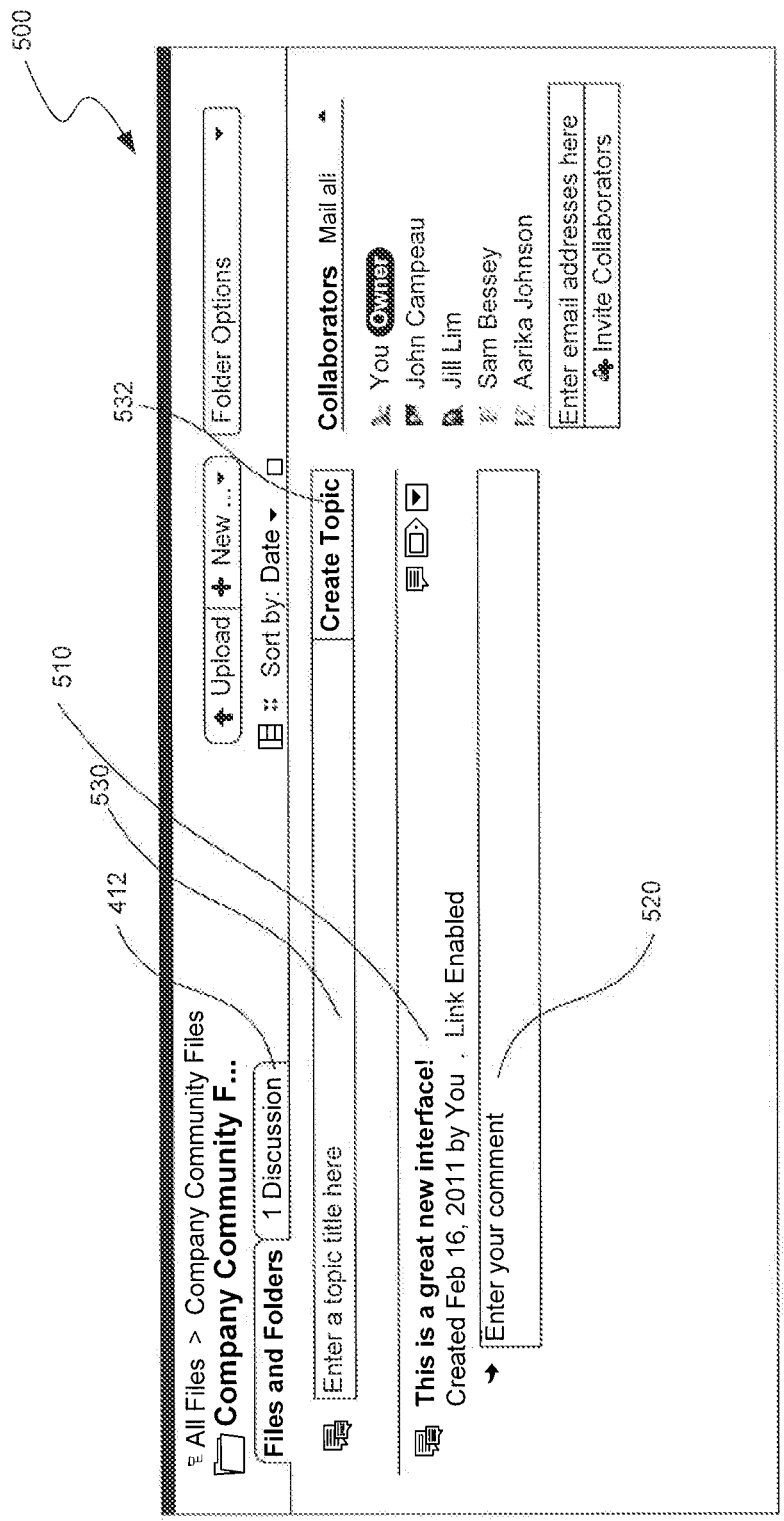
FIG. 5 depicts a screenshot of an example user interface that shows a field for entering a topic in a discussion workspace.

FIG. 5 shows an example screenshot of the discussion workspace 500 when a user/collaborator clicks on tab 412. The ongoing discussion topic 510 is called "This is a great new interface!" Users/collaborators can provide comments on this topic in the "Enter your comment" field 520. Users/collaborators can also start a new topic of discussion in the "Enter a topic title here" field 530 and clicking on the button "Create Topic" 532.

Figure 6:
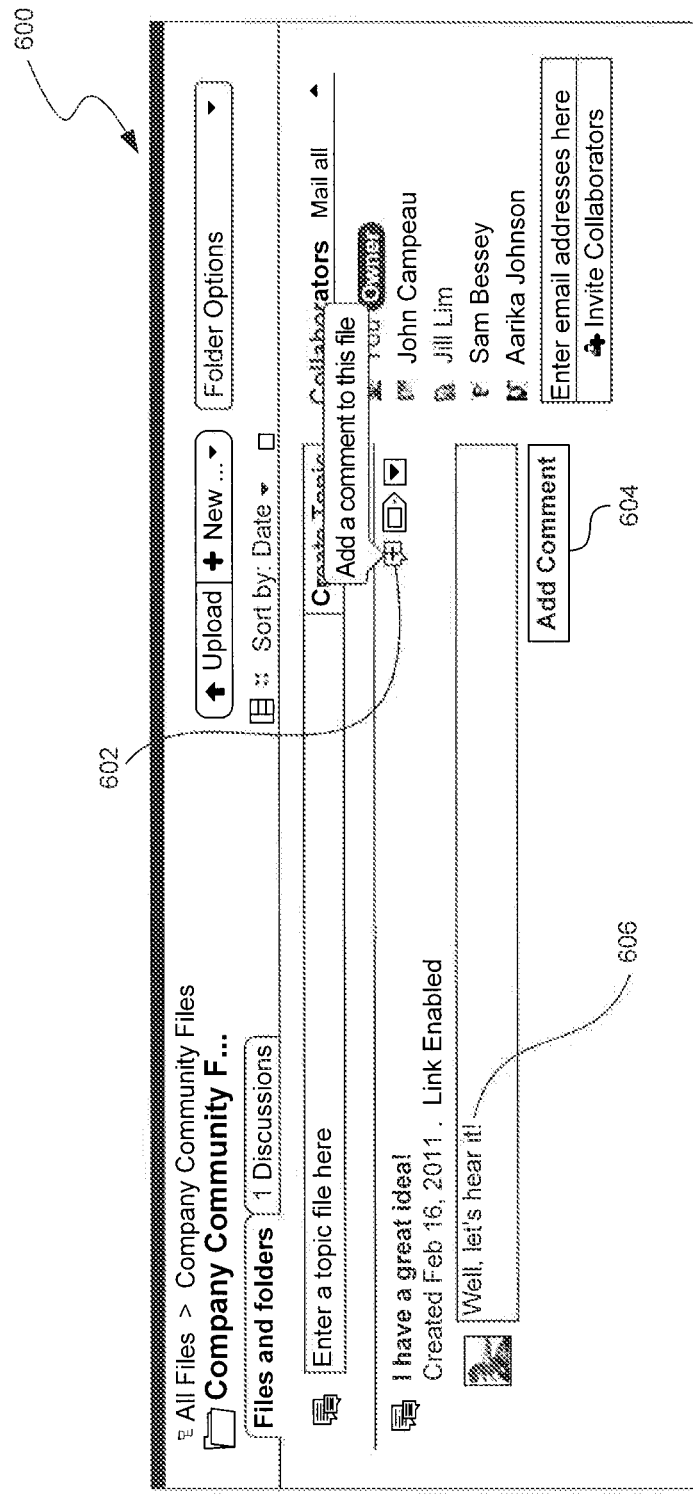
FIG. 6 depicts a screenshot of an example user interface that shows a comment field in a discussion workspace.

FIG. 6 shows an example screenshot of the discussion workspace 600 when a user/collaborator has entered a comment. When a user/collaborator clicks on the comment button 602 associated with a discussion topic, all previous comments in the discussion under that topic are displayed, and the "Enter your comment" field is shown. In the example of FIG. 6, the comment 606 "Well, let's hear it!" has been entered. After entering a comment, the user/collaborator clicks on the "Add Comment" button 604 to add the comment to the online discussion. In one embodiment, comments and topics can be received and shown in the discussion workspace in real time or in near real time.

Figure 7:
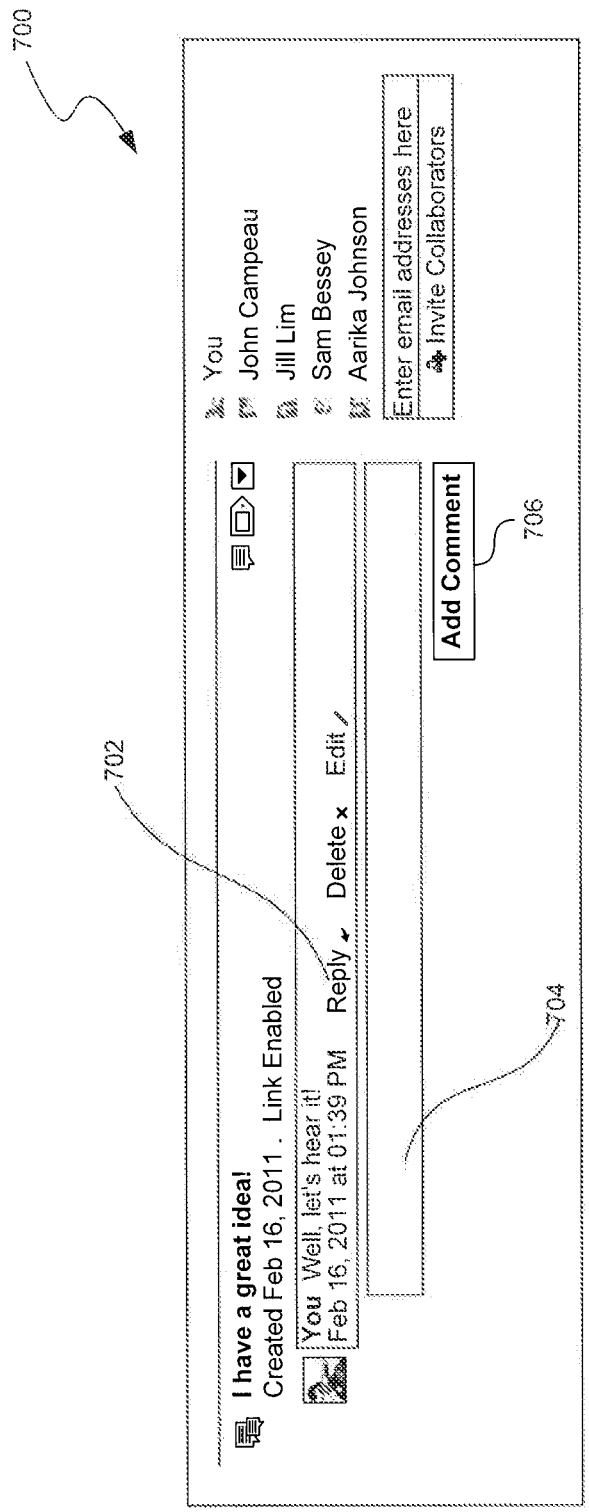
FIG. 7 depicts a screenshot of an example user interface that shows a comment field for responding to a comment in a discussion workspace.

FIG. 7 shows an example screenshot of the discussion workspace 700 when a user/collaborator clicks on the reply button 702 associated with a previous comment in a discussion. A new comment field 704 appears that is indented to show the level of the comment. Once the user/collaborator enters his comment in field 704, clicking the button 'Add Comment' 706 will add the comment to the discussion.

Figure 8:
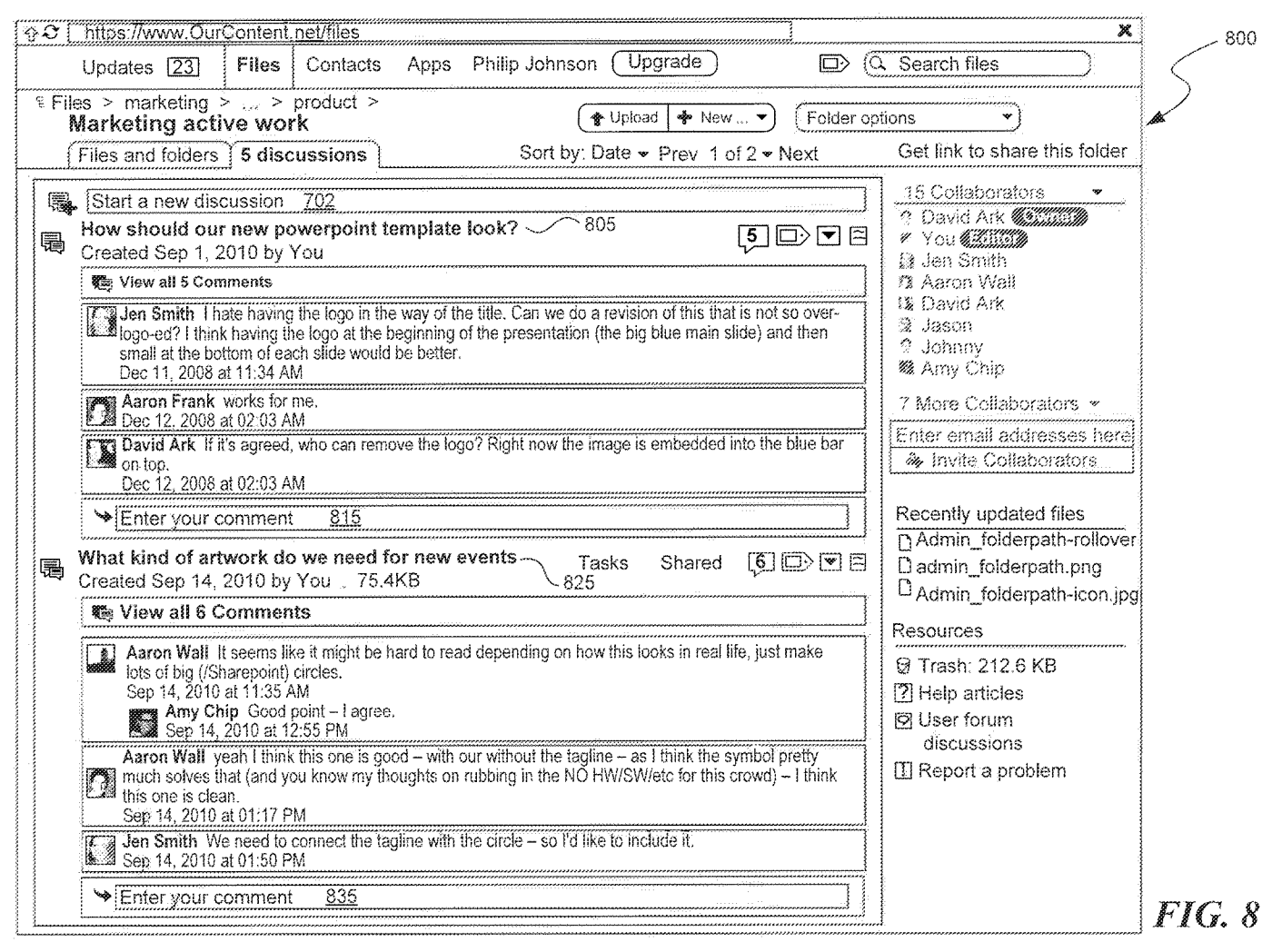

FIG. 8 shows another example screenshot of the discussion workspace 800 that has two discussions shown under the topics 805 and 825. Further comments in the two discussions can be entered in the comment field 815 and 835, respectively.

Figure 9A:
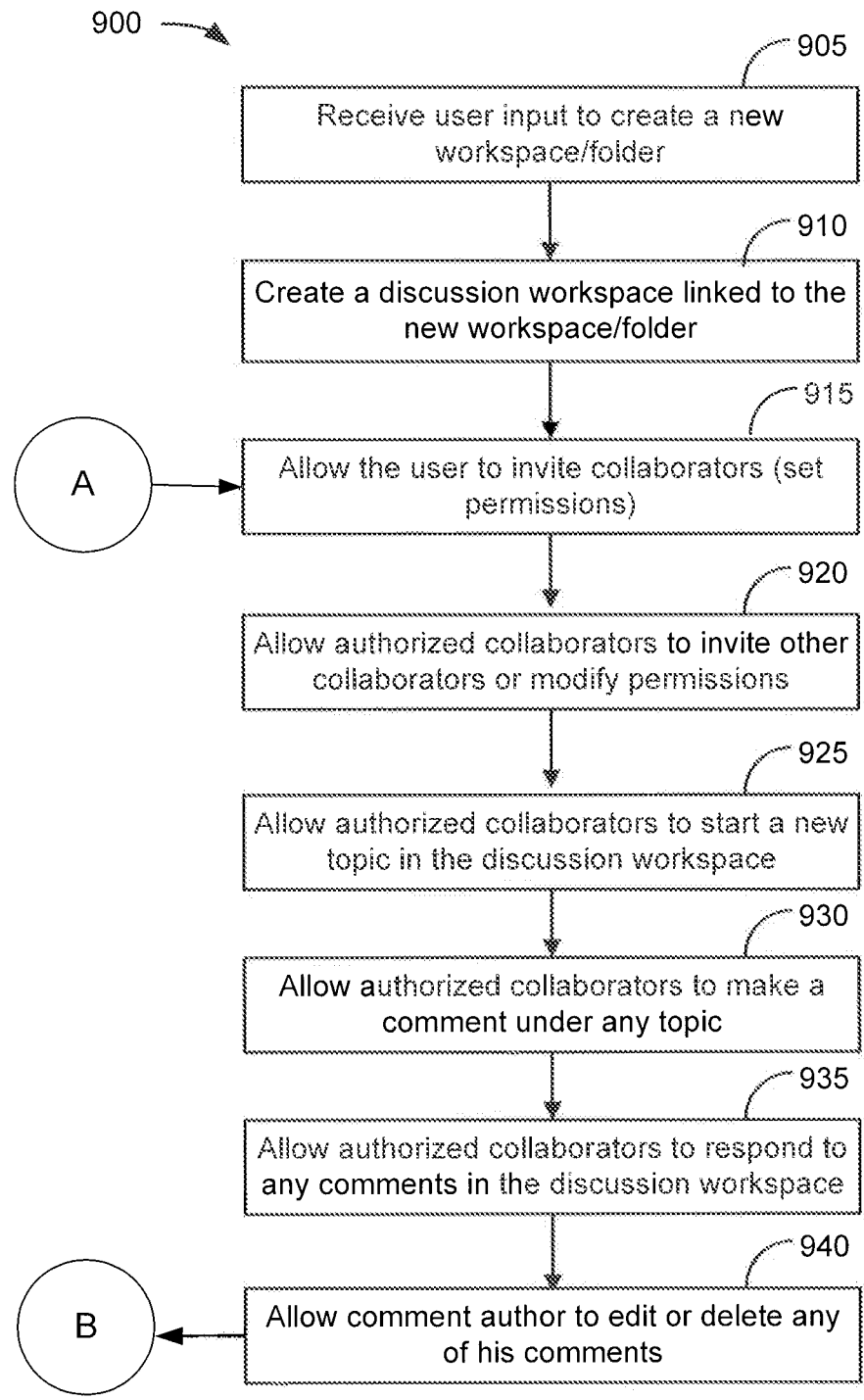
FIGS. 9A and 9B depict a flow diagram illustrating an example process of providing a discussion workspace linked to a workspace containing work items.
Figure 9B:
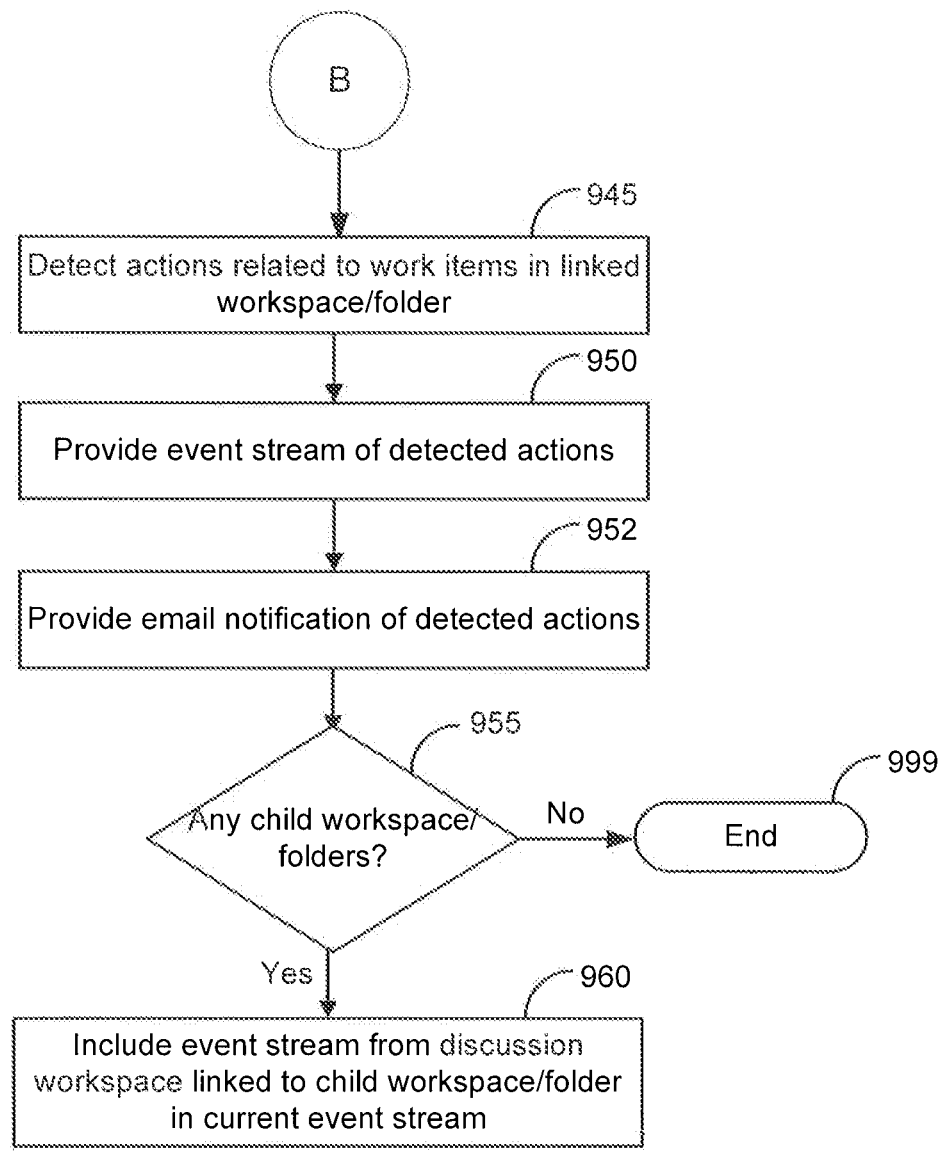

FIG. 9 is a flow diagram illustrating an example process 900 of providing a discussion workspace. At block 905, the system receives user input to create a new workspace/folder. In order to send the request to create the new workspace/folder, the user should have an access permission level that allows him to do so. Then at block 910, the system creates the new workspace/folder specified by the user along with a new discussion workspace linked to the new workspace/folder.

Then at block 915, the system allows the user to invite collaborators to the new workspace/folder. Any users invited to join the new workspace/folder can also join the discussion workspace, and vice versa. The user who created the new workspace/folder can set the permission level of each new user/collaborator invited to join.

Next, at block 920, the system also allows authorized user/collaborators to invite other user/collaborators to join the new workspace/folder and the linked discussion workspace and to set the permission level of each new user/collaborator invited to join.

Because the workspace/folder is new, no discussions yet exist in the discussion workspace. At block 925, the system allows authorized collaborators to start new topics in the discussion workspace. Although the discussion workspace is intended to facilitate communications among collaborators relating to the work items in the linked new workspace/folder, user/collaborators are not restricted by the system to comments that do so.

At block 930, the system allows authorized user/collaborators to make a comment under any topic that has been started. Then at block 935, the system allows authorized user/collaborators to respond to any comments that are in the ongoing dialogues in the discussion workspace. And at block 940, the system allows a comment author to edit or delete any of his comments in the discussion workspace.

The process continues at block 945 where actions related to work items in the linked workspace/folder are detected, and the detected actions are part of an event stream that is shown in the discussion workspace at block 950. At block 952, email notification of detected actions, such as the creation of a new discussion topic or thread or the addition of a new discussion reply, can be sent to collaborators.

At decision block 955, the system determines if there any child workspace/folders within the current workspace/folder. If there are no child workspace/folders (block 955—No), the process ends at block 999. If there are child workspace/folders (block 955—Yes), at block 960, the event stream from the discussion workspace linked to the child workspace/folder is included in the event stream of the current workspace/folder.

Figure 10:
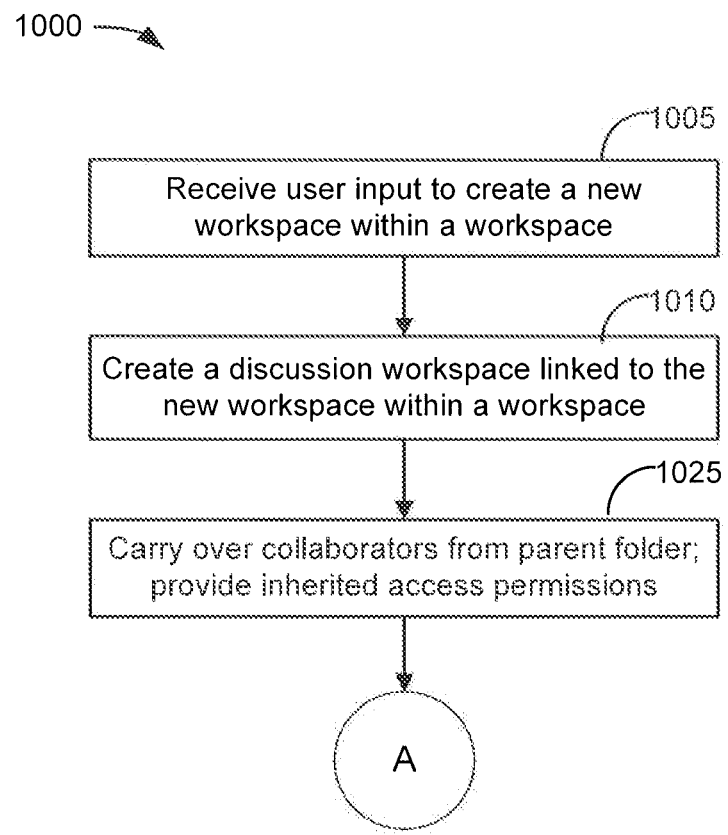
FIG. 10 depicts a flow diagram illustrating an example process of providing a discussion workspace linked to a workspace within a workspace.

FIG. 10 is a flow diagram illustrating an example process 1000 of providing a discussion workspace for a workspace within a workspace. In one embodiment, the workspace within a workspace is a sub-folder of a parent folder.

At block 1005, the system receives user input to create a new workspace within an existing workspace. If the user is authorized to crate the new workspace, at block 1010, the system creates the new workspace and a discussion workspace linked to the new workspace within a workspace.

At block 1025, the system carries over collaborators from the parent workspace and provides inherited access permissions. Thus, if a collaborator is assigned a permission level that allows him to took at all files and participate in discussions in the parent workspace/folder, the same permissions would apply to the collaborators in the child workspace/folder. The process then continues to block 915 in FIG. 9A.

Figure 11:
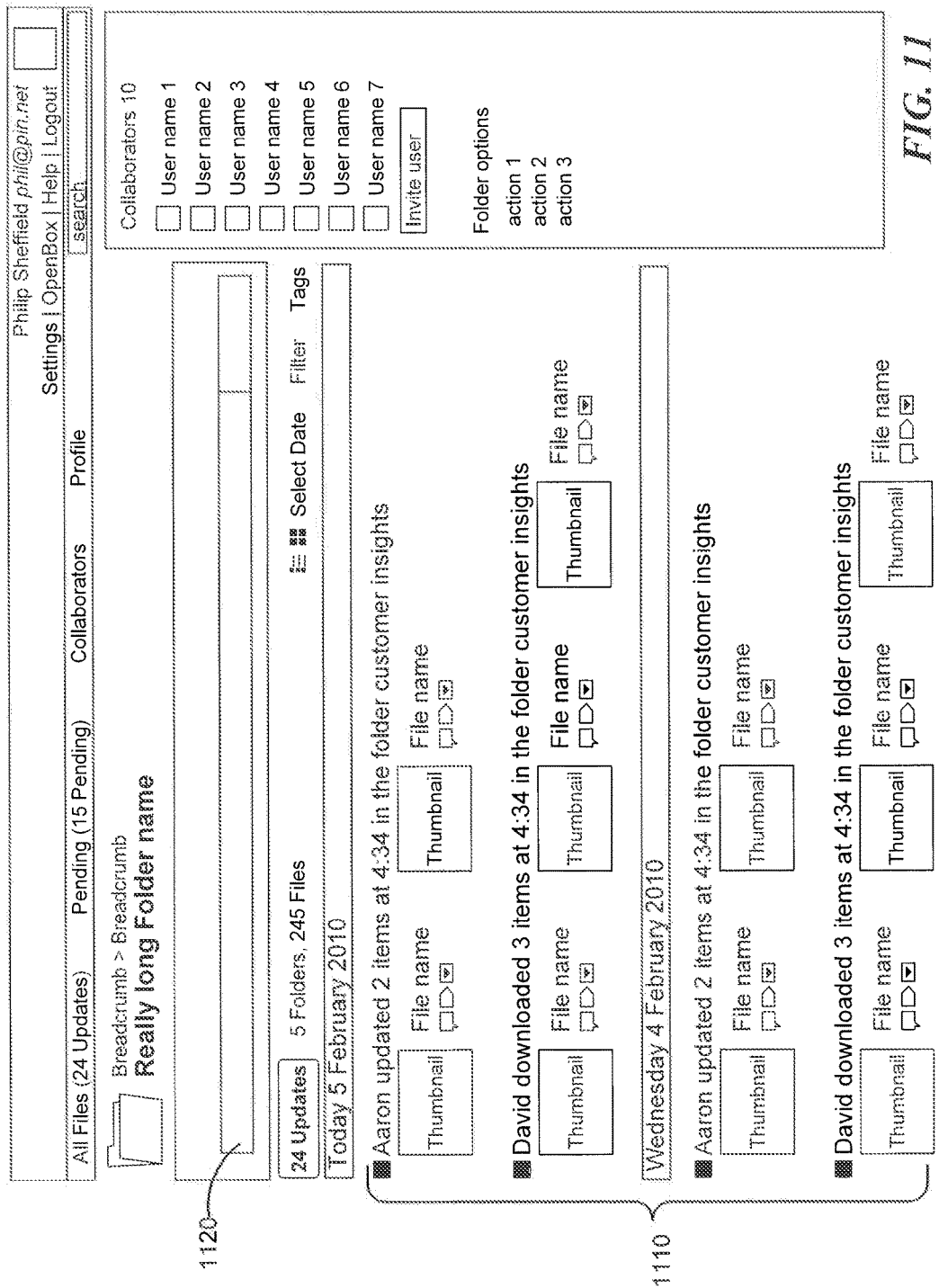
FIG. 11 shows a screenshot of an example user interface showing an event stream in a discussion workspace.

FIG. 11 shows a screenshot of an example user interface showing an event stream in a discussion workspace. The event stream 1110 shows activities performed by collaborators relating to the work items in the linked workspace/folder, for example, updating and downloading work items. The example event stream activities include information about the collaborator who performed the activity, the type of activity, the time and date of the activity, and the work item (e.g. file) on which the action was performed. However, the activities in the event stream can be adjusted to include more information, for example, more details about the activity such as the names of the items updated or downloaded, or the creator of the work item.

The event stream 1110 lists activities in strict chronological order, listing the most recent activity first. However, the event stream can be customized by the user or the owner/administrator of the workspace. For example, event stream activities can be organized according to the type of activities, and within each type of activity, the event stream can provide a chronological listing of activities.

In addition to the event stream, collaborators can still maintain an online discussion by using the add topic field 1120 and adding a comment or replying to an ongoing discussion.

FIG. 12 shows a screenshot of another example user interface showing an event stream in a discussion workspace. The event stream 1220 shows example activities such as previewing a work item from a shared link. Additionally, there is an idea/link field 1210 shown in FIG. 12. The idea/link field 1210 gives a user/collaborator a way to share an idea or a link as part of an online discussion by entering it in the field. In one embodiment, the idea/link field 1210 can replace the add topic field described above.

Figure 13:
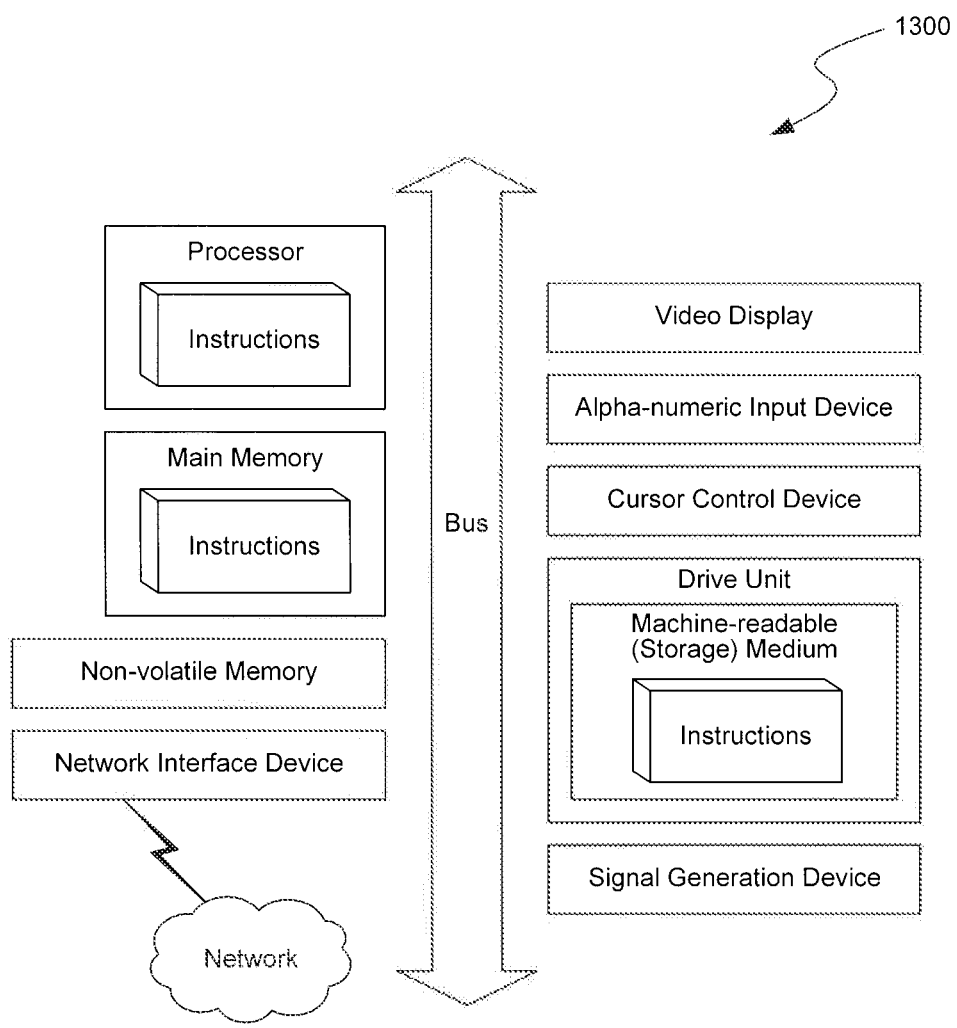
FIG. 13 shows a diagrammatic representation of a machine in the example form of a computer system within which a set of instructions, for causing the machine to perform any one or more of the methodologies discussed herein, may be executed.

FIG. 13 shows a diagrammatic representation of a machine 1300 in the example form of a computer system within which a set of instructions, for causing the machine to perform any one or more of the methodologies discussed herein, may be executed In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 1300 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. § 112, sixth paragraph, other aspects may likewise be embodied as a means-plus-function claim, or in other forms, such as being embodied in a computer-readable medium. (Any claims intended to be treated under 35 U.S.C. § 112, ¶ will begin with the words "means for.") Accordingly, the applicant reserves the right to add additional claims after filing the application to pursue such additional claim forms for other aspects of the invention.

We claim:

1. A method for managing a plurality of discussion workspaces in a cloud-based collaboration service, comprising:

generating, in the cloud-based collaboration service, the plurality of discussion workspaces for a plurality of workspaces, wherein the plurality of workspaces includes a first folder having one or more files, wherein the first folder includes a sub-folder having at least one file, the first folder and the sub-folder organized as a folder-file hierarchy, wherein the plurality of discussion workspaces includes a first discussion workspace that is associated with the first folder, the first discussion workspace maintaining communications relating to the one or more files in the first folder from at least one of a user of the cloud-based collaboration service or one or more collaborators of the user, wherein the first discussion workspace includes a second discussion workspace that is associated with the sub-folder of the first folder, the second discussion workspace to maintain communications relating to the sub-folder from the one or more collaborators and the user, wherein the first discussion workspace and the second discussion workspace are organized in the same folder-file hierarchy as the first folder and the sub-folder, receiving a request from a user to access communications relating to one or more of the plurality of workspaces; and generating, in response to the request, a user interface to display the communications relating to the one or more of the plurality of workspaces, wherein the user interface includes a workspace area to enable the user to select one of the plurality of workspaces displayed in the workspace area, wherein the user interface includes a discussion area that is configured to display the communications based on a level of engagement of the user in the communications, wherein generating the user interface further includes:

receiving, from the user, a selection of the one of the plurality of workspaces displayed in the workspace area, in an event the user is engaged in a first quantity of communications relating to the plurality of workspaces, configuring the discussion area to include communications from the plurality of discussion workspaces, in an event the user is engaged in a second quantity of communications relating to the plurality of workspaces, which is larger than the first quantity, configuring the discussion area to (a) include communications from a discussion workspace that corresponds to the one of the plurality of workspaces selected by the user in the workspace area, and (b) exclude communications from other discussion workspaces of the plurality of discussion workspaces, further wherein collaborating on the one or more files includes receiving at least one action including edits on the one or more files via the cloud-based collaboration service.

2. The method of claim 1, wherein receiving the edits on the one or more files includes one or more of, updates, revisions, downloads, preview, or tags of the one or more files.

3. The method of claim 1, wherein communications in the first discussion workspace can be organized by user and the one or more collaborators according to topics submitted by the user and the one or more collaborators; wherein the first discussion workspace further includes an event stream of actions associated with the one or more files.

4. The method of claim 1, wherein the one or more collaborators are required to be pre-authorized to submit communications to the first discussion workspace.

5. The method of claim 1, wherein a first set of grouped stored files is contained in a first hierarchical container, and the first hierarchical container is contained in a second hierarchical container, and further wherein communications entered in a first discussion workspace associated with the first hierarchical container is visible in a second discussion workspace associated with the second hierarchical container.

6. The method of claim 1, wherein the first discussion workspace is maintained in real time or near real time.

7. A method for managing a plurality of discussion workspaces in a cloud enabled collaboration platform, comprising:

generating a first discussion workspace linked to a first workspace in a cloud enabled collaboration platform, wherein the first workspace includes work items, and wherein the first discussion workspace is distinct from the first workspace and maintains comments associated with the work items;

generating a second discussion workspace linked to a second workspace contained within the first workspace, the second discussion workspace being distinct from the first discussion workspace and used to maintain comments associated with the second workspace, the first workspace and the second workspace organized as a folder-file hierarchy, wherein the first discussion workspace and the second discussion workspace are organized in the same folder-file hierarchy as the first workspace and the second workspace; and receiving and causing to be displayed in a discussion area of a web-based interface, a comment from a user of the first workspace, wherein the comment is accessible to a plurality of collaborators of the user in the discussion area, wherein the collaborators of the user are further able to respond to the comment of the user in the discussion area, wherein the discussion area is configured to display comments associated with at least one of the first workspace or the second workspace based on a level of engagement of the user in the comments by:

receiving, from the user, a selection of the first workspace or the second workspace in a workspace area of the web-based interface, in an event the user is engaged in a first quantity of comments relating to the first workspace and the second workspace, configuring the discussion area to include comments from the first discussion workspace and the second discussion workspace, in an event the user is engaged in a second quantity of comments relating to the first workspace and the second workspace, which is larger than the first quantity, configuring the discussion area to include comments from a discussion workspace that corresponds to the first workspace or the second workspace selected by the user and exclude comments from a discussion workspace corresponding to the first workspace or the second workspace that is not selected by the user, further wherein, the user and collaborators of the user, are able to perform at least one action including edits on the work items via the cloud-based service.

8. The method of claim 7, wherein, the actions including edits on the work items include one or more of, updates, revisions or downloads of the work items.

9. The method of claim 7, wherein the collaborators are required to have access permission to the discussion area to access the discussion area or to leave comments in the discussion area, the method further comprising:
receiving a discussion topic from one of the collaborators and causing the discussion topic to be displayed in the discussion area to help collaborators organize displayed comments.

10. The method of claim 7, wherein the first workspace includes a folder that is part of a folder tree structure used by a user to organize the work items stored by the system.

11. The method of claim 7, wherein the at least one action including edits on the work items include preview, or tags of the work items.

12. The method of claim 7, wherein authorized collaborators are permitted to invite a new user to join as a new collaborator of the first workspace and to participate in the discussion area.

13. The method of claim 7, further comprising:
identifying actions taken on the work items within the first workspace; and
causing to be displayed in the discussion area an event stream of the identified actions.

14. The method of claim 13, wherein the event stream is organized chronologically.

15. The method of claim 13, wherein the first workspace is a folder that is part of a folder tree structure used to organize work items stored by the system, and further wherein action taken on work items in a sub-folder within the folder are also part of the event stream.

16. A non-transitory machine-readable storage medium having stored thereon instructions which when executed by a processor, causes a processor to execute a method enabling discussions in a cloud-based collaborative environment, the method, comprising:
generating a first discussion workspace associated with a first workspace in a cloud enabled collaboration platform, wherein the first workspace includes a first file of a user, wherein communications related to the first workspace from the user and collaborators of the user are received and maintained in the first discussion workspace, and further wherein communications in the first discussion workspace are limited to the user and the collaborators of the first file; and
generating a second discussion workspace associated with a second workspace contained within the first workspace, the second discussion workspace being distinct from the first discussion workspace, the second discussion workspace including a second file and used to maintain communications related to the second discussion workspace, the first workspace and the second workspace organized as a folder-file hierarchy, wherein the first discussion workspace and the second discussion workspace are organized in the same folder-file hierarchy as the first workspace and the second workspace, generating a user interface to display communications relating to at least one of the first workspace or the second workspace, wherein the user interface includes a workspace area to enable the user to select one of the first workspace or the second workspace, wherein the user interface includes a discussion area that is configured to display the communications based on a level of engagement of the user in the communications by:
receiving, from the user, a selection of the first workspace or the second workspace in the workspace area,
in an event the user is engaged in a first quantity of communications relating to the first workspace and the second workspace, configuring the discussion area to include communications from both the first discussion workspace and the second discussion workspace,
in an event the user is engaged in a second quantity of communications relating to the first workspace and the second workspace, which is larger than the first quantity, configuring the discussion area to include communications from a discussion workspace that corresponds to the first workspace or the second workspace selected by the user and exclude communications from a discussion workspace corresponding to the first workspace or the second workspace that is not selected by the user,
wherein, the user and collaborators of the user, are able to perform at least one action including edits on the first file via the cloud-based service.

17. The non-transitory machine-readable storage medium of claim 16, wherein the communications in the first discussion workspace are maintained in real time.

18. The non-transitory machine-readable storage medium of claim 16, wherein one of the collaborators invites a new collaborator to join the communications.

19. A system, comprising:
a processor; and
a memory unit having instructions thereon which when executed by the processor, implements:
a discussion engine configured to:
generate a first online discussion workspace associated with a first workspace in a cloud-based environment, wherein the first workspace contains work items, and wherein the first online discussion workspace is distinct from the work items, the first online discussion workspace maintaining comments associated with the work items, and
generate a second online discussion workspace associated with a second workspace contained within the first workspace, the second online discussion workspace being distinct from the first online discussion workspace, the second online discussion workspace maintaining comments associated with the second workspace, the first workspace and the second workspace organized as a folder-file hierarchy, wherein the first online discussion workspace and the second online discussion workspace are organized in the same folder-file hierarchy as the first workspace and the second workspace, and
a user interface module configured to:
generate a user interface to display comments associated with at least one of the first workspace or the second workspace, wherein the user interface includes a workspace area to enable the user to select one of the first workspace or the second workspace, wherein the user interface includes a discussion area that is configured to display the comments based on a level of engagement of the user in the comments, wherein the user interface module is further configured to generate the user interface by:
receiving, from the user, a selection of the first workspace and the second workspace in the workspace area,
in an event the user is engaged in a first quantity of comments relating to the first workspace and the second workspace, displaying comments from both the first online discussion workspace and the second online discussion workspace, and in an event the user is engaged in a second quantity of comments relating to the first workspace and the second workspace, which is larger than the first quantity, displaying comments from an online discussion workspace that corresponds to one of the first workspace or the second workspace selected by the user and excluding comments from an online discussion workspace corresponding to the first workspace or the second workspace that is not selected by the user, wherein, the user and collaborators of the user, are able to perform actions including edits on the work items via the cloud-based service.

20. The system of claim 19, further comprising:

an activity detector configured to detect actions related to the work items in the workspace; and an event stream module configured to list the detected actions in the online discussion area.

21. The system of claim 19, wherein the first workspace is a folder that is part of a folder tree structure used by the user and the collaborators to organize work items stored in the cloud-based environment.

22. The system of claim 19, wherein the discussion engine is further configured to allow a collaborator to create a topic for discussion for organizing the comments in the discussion area.

23. A system, comprising a processor;

means for generating a first discussion workspace linked to a first workspace provided by a cloud-based environment, wherein the first workspace includes work items associated with a user and collaborators of the user means for generating a second discussion workspace linked to a second workspace contained within the first workspace, the second discussion workspace being distinct from the first discussion workspace and used to maintain comments associated with the second workspace, the first workspace and the second workspace organized as a folder-file hierarchy, wherein the first discussion workspace and the second discussion workspace are organized in the same folder-file hierarchy as the first workspace and the second workspace; and means for receiving and causing to be displayed in a discussion area of a web-based interface, a comment from the user, wherein the comment is accessible to the collaborators in the discussion area, wherein the collaborators of the user are further able to respond to the comment in the discussion area, wherein the discussion area is configured to display comments associated with at least one of the first workspace or the second workspace based on a level of engagement of the user in the comments by:

receiving, from the user, a selection of the first workspace or the second workspace in a workspace area of the web-based interface, in an event the user is engaged in a first quantity of comments relating to the first workspace and the second workspace, configuring the discussion area to include comments from the first discussion workspace and the second discussion workspace, in an event the user is engaged in a second quantity of comments relating to the first workspace and the second workspace, which is larger than the first quantity, configuring the discussion area to include comments from a discussion workspace that corresponds to one of the first workspace or the second workspace selected by the user and exclude comments from an discussion workspace corresponding to the first workspace or the second workspace that is not selected by the user, wherein, the user and collaborators of the user, are further able to manipulate the work items via the cloud-based service.

24. The system of claim 23, wherein manipulation of the files includes editing of the work items, including one or more of updates, revisions or downloads of the work items.

25. The system of claim 23, wherein manipulation of the work items includes one or more of preview, or tags of the work items.

* * * * *